(12) United States Patent
Mochizuki et al.

(10) Patent No.: US 11,017,276 B2
(45) Date of Patent: May 25, 2021

(54) INFORMATION PROCESSING APPARATUS, PRINTING SYSTEM, PRINTING METHOD, AND STORAGE MEDIUM THAT CORRECT WIDTHS OF LINES IN A FIRST DIRECTION INCLUDED IN A PRINT IMAGE BASED ON A PRINT RESULT OF A LINE WIDTH DETECTION IMAGE

(71) Applicant: CANON KABUSHIKI KAISHA, Tokyo (JP)

(72) Inventors: Yugo Mochizuki, Kawasaki (JP); Okinori Tsuchiya, Yokohama (JP); Tatsuhiro Yamagata, Inagi (JP); Kouta Murasawa, Yokohama (JP); Kazuya Ogasawara, Yokohama (JP); Toshiki Miyazaki, Tokyo (JP); Masao Kato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/580,439

(22) Filed: Sep. 24, 2019

(65) Prior Publication Data
US 2020/0104654 A1    Apr. 2, 2020

(30) Foreign Application Priority Data

Sep. 27, 2018   (JP) .............................. JP2018-182765

(51) Int. Cl.
*G06K 15/02*     (2006.01)
(52) U.S. Cl.
CPC ................................ *G06K 15/027* (2013.01)

(58) Field of Classification Search
CPC ........................... G06K 15/027; G06K 15/105
USPC ........................................................ 358/1.14
See application file for complete search history.

(56) References Cited

U.S. PATENT DOCUMENTS 8,817,327 B2    8/2014   Kamijima
2012/0120425 A1   5/2012   Kamijima

FOREIGN PATENT DOCUMENTS

JP           5482626 B2     5/2014

*Primary Examiner* — Tammy Paige Goddard
*Assistant Examiner* — Darryl V Dottin
(74) *Attorney, Agent, or Firm* — Venable LLP

(57) ABSTRACT

An information processing apparatus processes image information printed by a printing apparatus. The information processing apparatus includes a data obtaining unit to obtain print data for printing a line-width detection image including first multiple patches. Each of the first multiple patches includes multiple lines at substantially equal intervals in a first direction, each line having a first width in the first direction and extending in a second direction intersecting the first. The first multiple patches include first and second patches. A first substantially equal interval between a first plurality of lines in the first patch differs from a second substantially equal interval between a second plurality of lines in the second. An information obtaining unit obtains information on a print result of the printed line-width detection image. A correction unit corrects widths of lines in the first direction included in an image to be printed based on the obtained information.

14 Claims, 20 Drawing Sheets

| | | |
|---|---|---|
| VECTOR DRAWING COMMAND | LINE DRAWING COMMAND | INITIALIZING PEN DRAWING |
| | | SETTING PEN DRAWING AREA |
| | | SPECIFYING PEN |
| | | SETTING PEN LINE WIDTH |
| | | SETTING PEN COLOR |
| | | SETTING PEN CONNECTION SHAPE |
| | | MOVING WITHOUT DRAWING |
| | | DRAWING WITH SINGLE STROKE WHILE MOVING ON COORDINATES |
| | | LIFTING UP PEN |
| | | PAGE FEEDING |
| | CHARACTER DRAWING COMMAND | SPECIFYING CHARACTER FONT |
| | | SPECIFYING CHARACTER |
| | HATCHING DRAWING COMMAND | SPECIFYING HATCHING TYPE |
| | | SPECIFYING HATCHING DENSITY |
| BITMAP DRAWING COMMAND | BITMAP DRAWING COMMAND | INITIALIZING RASTER DRAWING |
| | | SPECIFYING COMPRESSION TYPE |
| | | SETTING RASTER DRAWING AREA |
| | | SPECIFYING RASTER IMAGE DATA |

FIG.5

| THIN LINE [mm] | THICK LINE [mm] | EXTRA-THICK LINE [mm] |
| --- | --- | --- |
| 0.25 | 0.50 | 1.00 |
| 0.18 | 0.35 | 0.70 |
| 0.13 | 0.25 | 0.50 |
| 0.09 | 0.18 | 0.35 |

FIG.6

1-PIXEL LINE

2-PIXEL LINE

3-PIXEL LINE

| | INPUT LINE WIDTH [mm] | OUTPUT LINE WIDTH OF PRINTING APPARATUS (108) [mm] | OUTPUT LINE WIDTH OF TARGET PRINTING APPARATUS (116) [mm] | INPUT LINE WIDTH AFTER CORRECTION [mm] |
|---|---|---|---|---|
| 1 | 0.18 | 0.27 | 0.90 | 0.67 |
| 2 | 0.25 | 0.37 | 1.06 | 0.81 |
| 3 | 0.35 | 0.50 | 1.25 | 0.97 |
| 4 | 0.50 | 0.69 | 1.50 | 1.19 |
| 5 | 0.70 | 0.93 | 1.77 | 1.43 |
| 6 | 1.00 | 1.29 | 2.12 | 1.74 |
| 7 | 1.40 | 1.74 | 2.51 | 2.10 |
| 8 | 2.00 | 2.40 | 3.00 | 2.56 |

FIG.15

ꢀꢀINFORMATION PROCESSING APPARATUS,
PRINTING SYSTEM, PRINTING METHOD,
AND STORAGE MEDIUM THAT CORRECT
WIDTHS OF LINES IN A FIRST DIRECTION
INCLUDED IN A PRINT IMAGE BASED ON
A PRINT RESULT OF A LINE WIDTH
DETECTION IMAGE

This application claims the benefit of Japanese Patent Application No. 2018-182765, filed Sep. 27, 2018, which is hereby incorporated by reference herein in its entirety.

BACKGROUND OF THE INVENTION

Field of the Invention

The present invention relates to an information processing apparatus for detecting the widths of lines included in print images, a printing system, a printing method, and a storage medium.

Description of the Related Art

Japanese Patent No. 5482626 discloses a method of adjusting the widths of lines printed by first and second printing apparatuses to the same widths by adjusting the densities of pattern images printed by those printing apparatuses to the same densities. Specifically, the combinations of the widths and colors of lines to be printed by the second printing apparatus are changed such that the average densities of pattern images printed by the second printing apparatus are equal to the average densities of the pattern images printed by the first printing apparatus.

SUMMARY OF THE INVENTION

In Japanese Patent No. 5482626, visual impressions of the lines printed by the first and second printing apparatuses can be adjusted to be the same by adjusting the average densities of the pattern images to the same densities, but, unfortunately, the widths of lines cannot be directly detected, and, hence, it is impossible to directly adjust the widths of the lines to the same widths.

In addition, direct detection of the widths of thin lines, which change due to ink bleeding or other factors, requires a highly accurate sensor. In the case of detecting, using a highly accurate sensor, the widths of thin lines printed with consecutive dots, it is difficult to directly detect the widths of the lines because the dots are detected. In addition, a method of adjusting the widths of the lines to the same widths by the user visually checking the widths of the lines printed by the first and second printing apparatuses forces the user to do complicated work.

The present invention provides an information processing apparatus, a printing system, a printing method, and a storage medium that make it possible to detect the widths of lines printed by a printing apparatus directly and easily.

In the first aspect, the present invention provides an information processing apparatus configured to process image information to be printed by a printing apparatus comprising a data obtaining unit configured to obtain print data for the printing apparatus to print a line-width detection image including first multiple patches, in which each of the first multiple patches includes multiple lines arranged side by side in a first direction, each line having a first width in the first direction and extending in a second direction intersecting the first direction, and, in which a distance between the centers in the first direction of two lines adjacent in the first direction of the multiple lines is different from one another, an information obtaining unit configured to obtain information on a print result of the line-width detection image by the printing apparatus, and a correction unit configured to correct the widths of lines in the first direction included in an image to be printed by the printing apparatus based on the information obtained by the information obtaining unit.

In a second aspect, the present invention provides a printing system comprising a printing apparatus and an information processing apparatus configured to process image information to be printed by the printing apparatus, the information processing apparatus including a data obtaining unit configured to obtain print data for the printing apparatus to print a line-width detection image including first multiple patches, in which each of the first multiple patches includes multiple lines arranged side by side in a first direction, each line having a first width in the first direction and extending in a second direction intersecting the first direction, and, in which a distance between the centers in the first direction of two lines adjacent in the first direction of the multiple lines is different from one another, an information obtaining unit configured to obtain information on print result of the line-width detection image by the printing apparatus, and a correction unit configured to correct the widths of lines in the first direction included in an image to be printed by the printing apparatus based on the information obtained by the information obtaining unit.

In a third aspect, the present invention provides a method of printing a line-width detection image for detecting the width of a line to be printed by a printing apparatus comprising a printing step of printing, with the printing apparatus, a line-width detection image including multiple patches, wherein each of the multiple patches includes multiple lines arranged side by side in a first direction, each line having a first width in the first direction and extending in a second direction intersecting the first direction, and a distance between the centers in the first direction of two lines adjacent in the first direction of the multiple lines is different from one another.

In a fourth aspect, the present invention provides a non-transitory computer readable storage medium storing a program for causing a computer to execute a method of printing a line-width detection image for detecting the width of a line to be printed by a printing apparatus, the method comprising a printing step of printing, with the printing apparatus, a line-width detection image including multiple patches, wherein each of the multiple patches includes multiple lines arranged side by side in a first direction, each line having a first width in the first direction and extending in a second direction intersecting the first direction, and a distance between the centers in the first direction of two lines adjacent in the first direction of the multiple lines is different from one another.

The present invention makes it possible to detect the widths of lines printed by a printing apparatus directly and easily.

Further features of the present invention will become apparent from the following description of exemplary embodiments with reference to the attached drawings.

BRIEF DESCRIPTION OF THE DRAWINGS

FIG. 5 is an explanatory diagram for details of the drawing commands.

FIG. 6 is an explanatory diagram for combinations of basic lines.

FIG. 15 is an explanatory diagram for a specific example of line-width adjustment values.

DESCRIPTION OF THE EMBODIMENTS

Figure 1A:
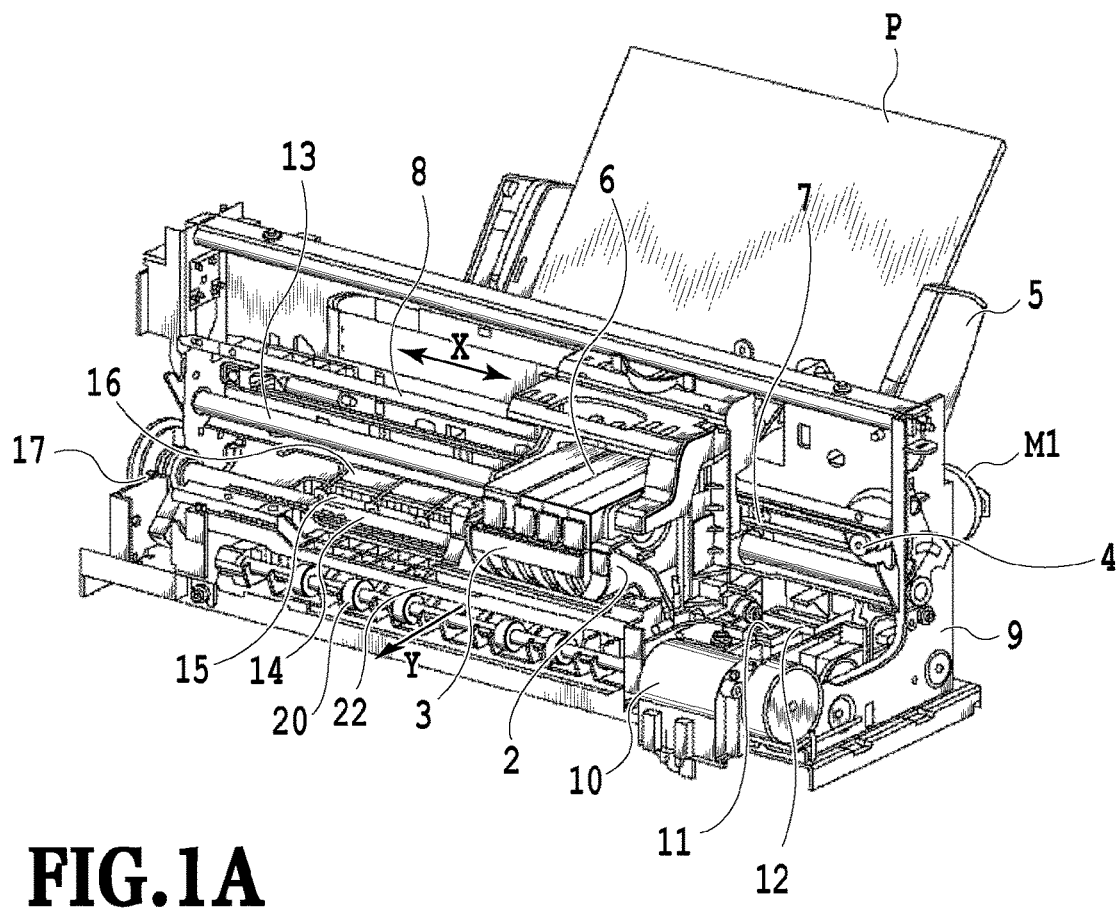
FIG. 1A is a perspective view of the inside of a printing apparatus according to an embodiment of the present invention.

Referring to the drawings, an embodiment of the present invention will be described below.

1. Configuration of Inkjet Printing Apparatus

FIG. 1A is a perspective view of the inside of an inkjet printing apparatus of what is called a serial scan type. In the inkjet printing apparatus (hereafter also referred to as a "printing apparatus"), in this example, the driving force of a carriage motor M1 is transmitted to a carriage 2 provided with an inkjet print head 3 capable of ejecting ink by a transmission mechanism 4. In the printing apparatus, the carriage 2, together with a print head 3, is moved back and forth in the arrow X direction, and a print medium P is conveyed by a paper feeding mechanism 5 in the arrow Y direction intersecting (in this example, orthogonal to) the arrow X direction.

The printing apparatus, to keep the ink ejecting condition of the print head 3 favorable, executes an ejection recovery process for the print head 3, moving the carriage 2 to a position of a recovery apparatus 10. The print head 3 and ink cartridges 6 for reserving ink to be supplied to the print head 3 are attached to the carriage 2. The ink cartridges 6 are detachably attached to the carriage 2. The printing apparatus, in this example, is capable of printing color images. Accordingly, the carriage 2 has four ink cartridges 6 for respectively storing black (K), cyan (C), magenta (M), and yellow (Y) inks. These four ink cartridges 6 can be attached and detached separately.

The carriage 2 and the print head 3 are configured such that their mating surfaces are properly in contact with each other and appropriate electrical connection can be achieved. The print head 3 selectively ejects ink from multiple ejection openings based on ink ejection energy applied according to print signals. The print head 3 in this example employs an inkjet system in which thermal energy is used to eject ink. The print head 3 includes electrothermal conversion elements for generating the thermal energy, and electrical energy applied to those electrothermal conversion elements is converted into thermal energy. The thermal energy applied to the ink causes film boiling in the ink, and the pressure change caused by the growth and contraction of the bubble in this state is used to eject ink from the ejection opening. This electrothermal conversion element is provided being associated with each ejection opening, and, when pulse voltage is applied to the electrothermal conversion elements corresponding to print signals, ink is ejected from the ejection openings associated with the electrothermal conversion elements. Besides electrothermal conversion elements, the print head 3 may employ piezo elements, or the like, for the ink-ejection-energy generating element.

The carriage 2 is connected to a portion of a drive belt 7 of the transmission mechanism 4 and slidably guided along a guide shaft 13 in the arrow X direction. Thus, the forward and reverse rotation of the carriage motor M1 moves the carriage 2 back and forth in the arrow X direction along the guide shaft 13. The printing apparatus also includes a scale 8 extending along the movement direction of the carriage 2 for detecting the absolute position of the carriage 2. The scale 8 in this example is made of a transparent PET film on which black bars are printed at specified intervals. One end of the scale 8 is fixed to a chassis 9, and the other end is supported by a plate spring (not illustrated).

The printing apparatus also has a platen (not illustrated) provided to face the ejection opening surface of the print head 3, where the ejection openings (not illustrated) are formed. The driving force of the carriage motor M1 moves the carriage 2 equipped with the print head 3 back and forth, and, at the same time, the print head 3 ejects ink according to print signals. With these operations, an image is printed across the entire width of a print medium P conveyed onto the platen.

A conveying roller 14 for conveying print media P is driven by a conveying motor M2, a pinch roller 15 is pressed against the conveying roller 14 by the urging force of a spring (not illustrated), and the pinch roller 15 is rotatably supported by a pinch roller holder 16. A conveying roller gear 17 is fixed to an end of the conveying roller 14, and the rotation of the conveying motor M2 transmitted to the conveying roller gear 17 via an intermediate gear (not illustrated) drives the conveying roller 14. A discharging roller 20 is a roller for discharging a print medium P on which an image has been printed by the print head 3 to the outside of the printing apparatus and is driven by the conveying motor M2. A spur roller (not illustrated) is pressed against the discharging roller 20 by the urging force of a spring (not illustrated). The spur roller is rotatably supported by a spur holder 22.

The printing apparatus has the recovery apparatus 10, which is for keeping the ink ejecting condition of the print head 3 favorable and is disposed at a position outside the range of back and forth movement of the carriage 2. The position of the recovery apparatus 10 may be, for example, a position corresponding to the home position outside the print area, or the like. The recovery apparatus 10 includes a capping mechanism 11 for capping the ejection opening surface of the print head 3 and a wiping mechanism 12 for cleaning the ejection opening surface of the print head 3. In conjunction with the capping mechanism 11 capping the ejection opening surface, a suction unit (such as a suction pump) in the recovery apparatus forcibly sucks and discharges ink from the ejection openings. The recovery process is performed through this operation for removing thickened ink, bubbles, and the like, in ink flow paths of the print head 3. In addition, capping the ejection opening surface of the print head 3 with the capping mechanism 11 in non-printing operation, or the like, protects the print head 3 and prevents the volatile components of ink from evaporating and the ejection openings from drying. The wiping mechanism 12 is located near the capping mechanism 11 and configured to wipe off ink droplets attached to the ejection opening surface of the print head 3. With these capping mechanism 11 and wiping mechanism 12, the ink ejecting condition of the print head 3 can be kept favorable.

2. Configuration of Print Head

Figure 1B:
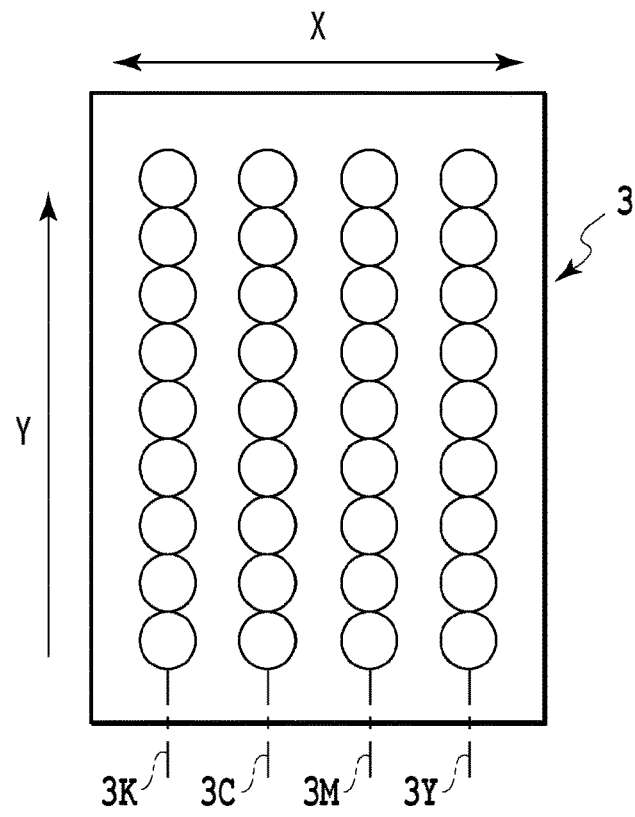
FIG. 1B is an explanatory diagram for nozzle rows in the print head in FIG. 1A.

FIG. 1B is a diagram for explaining nozzle rows 3K, 3C, 3M, and 3Y for respective ink colors in the print head 3. The nozzle row 3K is for black ink, the nozzle row 3C for cyan ink, the nozzle row 3M for magenta ink, and the nozzle row 3Y for yellow ink. Because multiple nozzle rows are arranged in the lateral direction (the X direction), a print head having such nozzle configuration is also referred to as a lateral configuration head. The number of nozzles composing each nozzle row is, for example, 256. FIG. 1B illustrates nine nozzles representatively.

The arrangement of the nozzle rows is not limited to the example shown in FIG. 1B. The order of the nozzle rows may be any order, the number of nozzles included in each nozzle row may be different, and the print head 3 may have nozzle rows in various arrangements. Although the print head 3 in FIG. 1B has a configuration in which the nozzle rows for all ink colors are integrally formed on one chip, the nozzle rows for the respective ink colors may be formed on different chips. Alternatively, of the four colors (C, M, Y, and K), the nozzle row of one color (for example, K) and the nozzle rows of the other three colors (for example, C, M, and Y) may be formed on different chips.

3. Configuration of Printing System

Figure 2:
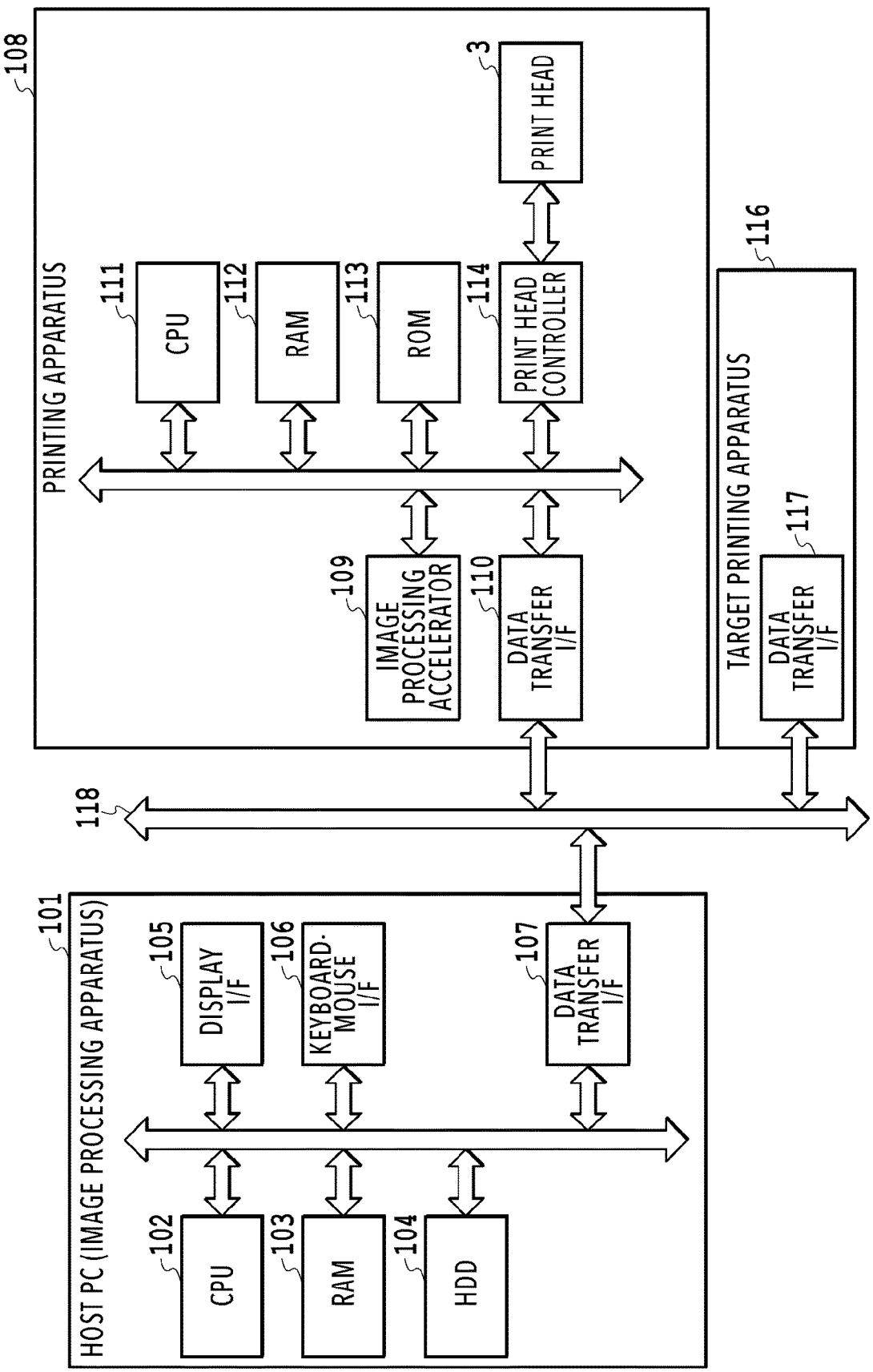
FIG. 2 is a configuration diagram of a printing system according to the embodiment of the present invention.

FIG. 2 is a block diagram of a printing system in the present embodiment.

An image processing apparatus (information processing apparatus) 101 is composed of a host apparatus, such as a host PC and a tablet PC, and a CPU 102, according to programs stored in a HDD 104, executes various processes, such as image information processing, using RAM 103 as a work area. For example, the CPU 102 generates printable image data based on commands received from the user via a keyboard mouse I/F 106 and a touch panel (not illustrated) and programs stored in the HDD 104, and, then, the CPU 102 transfers it to a printing apparatus 108. The HDD 104 also stores the image data of a line-width detection image described later and a program for executing a line-width detection process, and the program is executed by the CPU 102. The image processing apparatus 101 performs a specified process on image data received from the printing apparatus 108 via a data-transfer I/F 107 according to a program stored in the HDD 104. The process results and various kinds of information are displayed on a not-illustrated display via a display I/F 105. The image processing apparatus 101 is capable of performing the same or similar process for a target printing apparatus 116 having the same or similar configuration as the printing apparatus 108.

In the printing apparatus 108, a CPU 111 executes various processes according to programs stored in ROM 113 using RAM 112 as a work area. The printing apparatus 108 includes an image processing accelerator 109 for performing high-speed image processing. The image processing accelerator 109 is hardware capable of executing image processing at a higher speed than the CPU 111 does. The image processing accelerator 109 is activated by the CPU 111 writing parameters and data necessary for the image processing into specified addresses of the RAM 112. After reading those parameters and the data, the image processing accelerator 109 executes specified image processing on the data. Here, the image processing accelerator 109 is not an essential component, but the same or similar process can be executed by the CPU 111. The above parameters may be stored in the ROM 113, or they may be stored in a storage (not illustrated), such as flash memory or an HDD.

Print data, after specified image processing by the image processing apparatus 101 and the printing apparatus 108, is transferred to the print head 3 by a print head controller 114. The CPU 111 controls the carriage motor and the conveying motor. The operation (printing scan) of ejecting ink based on print data while moving the print head 3 together with the carriage 2 in the arrow X direction (main scanning direction) and the operation of conveying a print medium in the arrow Y direction (sub scanning direction) are repeated to print an image on a print medium. The printing apparatus 108 in this example is capable of ejecting four colors of pigment ink—K, C, M, and Y—from the print head 3, and the amount of ink ejected from each nozzle is 4 pl. The target printing apparatus 116 in this example is a printing apparatus that ejects four colors of pigment ink—K, C, M, and Y—which are different from the ones in the printing apparatus 108, from a print head different from the one in the printing apparatus 108, and the amount of ink ejected from each nozzle is 6 pl.

The image processing apparatus 101 is connected to the printing apparatus 108 and the target printing apparatus 116 via a communication line 118. Both the printing apparatus 108 and the target printing apparatus 116 do not need to be connected to the image processing apparatus 101 all the time. The connection may be turned off as necessary. The target printing apparatus 116 is not limited to an inkjet printing apparatus such as the printing apparatus 108, but it may be a printing apparatus such as a laser beam printing apparatus, copier, or LED plotter. The communication line 118 may be, besides a local area network, a USB hub, wireless communication network using a wireless access points, a connection using a Wifi direct function, or the like.

4. Image Processing

The specified image processing by the image processing apparatus 101 and the printing apparatuses 108 and 116 is an image data conversion process for generating, from inputted print data, data indicating positions at which ink dots to be formed for each printing scan. In the following, the image data conversion process in the printing apparatus 108 will be described, but the same is true of the target printing apparatus 116.

Figure 3:
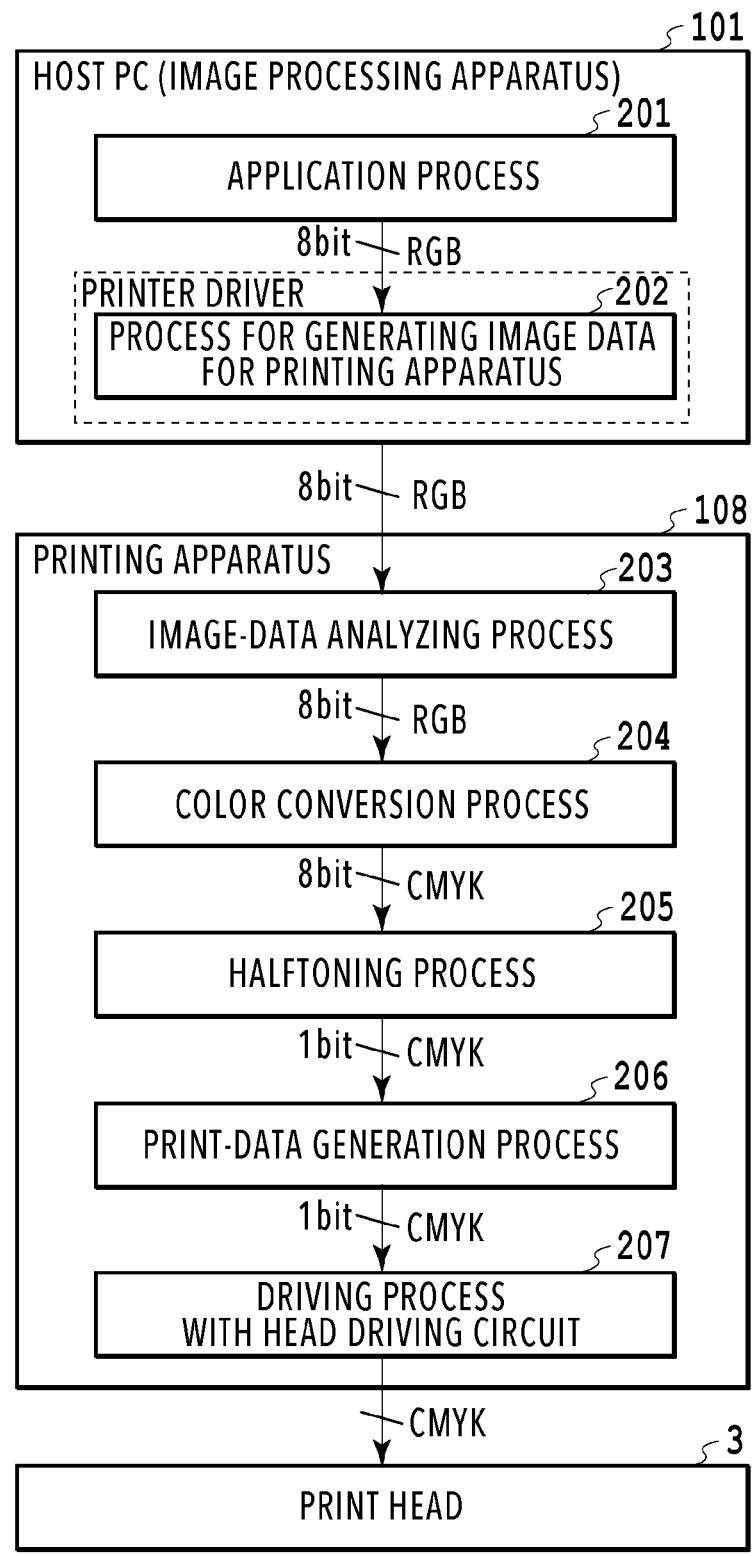
FIG. 3 is an explanatory diagram for print-data conversion processes in the printing system of FIG. 2.

FIG. 3 is a block diagram for explaining the procedure of the image data conversion process. Image processing in the printing system of this example is executed by a personal computer (PC) serving as the image processing apparatus 101 and the printing apparatus 108.

4-1. Process in Image Processing Apparatus

Programs that run with the operating system of the image processing apparatus 101 include applications and printer drivers. Examples of the applications include an application for drawing CAD drawings. At an application process 201, a process for generating image data corresponding to an image to be printed by the printing apparatus 108 is executed by the application. The image data generated by the application process 201 is passed to the printer driver.

The printer driver of the image processing apparatus 101 generates image data in a page-description language (PDL) format. Hereafter, image data in the PDL format is referred to as "PDL data". Examples of known PDLs include "PDF" and "PostScript" developed by Adobe Inc., and "HPGL/2" developed by Hewlett-Packard. PDL is widely used as an image format in which, not only bitmap, but vector data such as lines and characters can be written. The printer driver performs a generation process 202 for generating image data for the printing apparatus from the image data passed from the application. The image data for the printing apparatus is PDL data, and the printer driver generates the image data for the printing apparatus, adding a header including setting information on printing set through a user interface (UI) of the image processing apparatus 101. The generated image data for the printing apparatus is sent from an I/F 107 of the image processing apparatus 101 to the printing apparatus 108 through an I/F 110 of the printing apparatus 108 and stored in data buffer RAM 112.

Figure 4A:
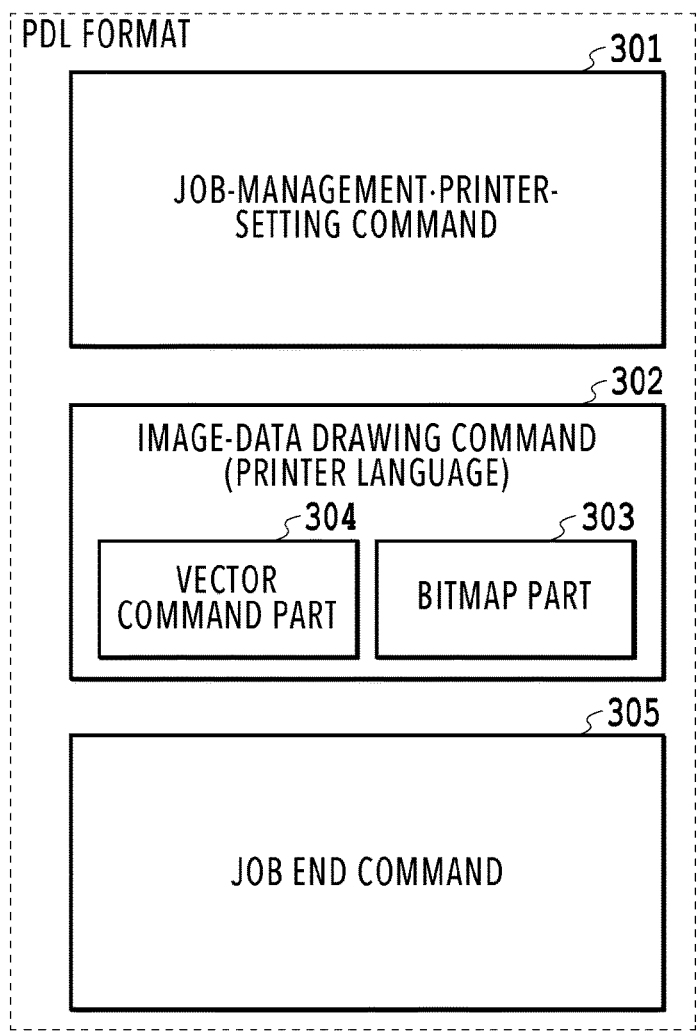
FIG. 4A is an explanatory diagram for a page description language (PDL) format and drawing commands.
Figure 4B:
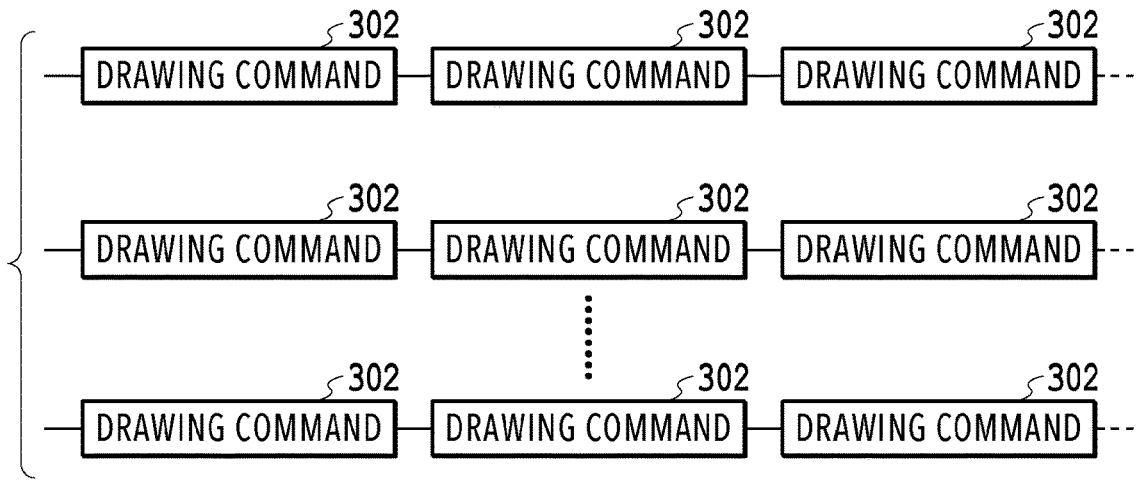
FIG. 4B is an explanatory diagram for image-data drawing commands.

FIG. 4A is an explanatory diagram for an example of a PDL format. The PDL format includes a job-management & printer-setting command 301, image-data drawing command 302, and job end command 305. The image-data drawing command 302 includes a bitmap part 303 and a vector command part 304 and, thus, is of a format that can express not only bitmap but figures, such as characters and lines. FIG. 4B is an explanatory diagram for the image-data drawing command 302. The image-data drawing command 302 includes multiple series of drawing commands 302 (referred to as a display list (DL)) by a certain unit (in this case, 64 [KB]).

FIG. 5 is a command list table for explaining details of the drawing commands 302. The drawing commands 302 are broadly divided into bitmap drawing commands and vector drawing commands. Further, the vector drawing commands are broadly divided into "line drawing commands" related to the color, line width, drawing, and the like, of the pen; "character drawing commands" for specifying a character font and a character itself; and "hatching drawing commands" for specifying a hatching type and the density. Image data in a PDL format described above is sent from the image processing apparatus 101 to the printing apparatus 108.

4-2. Process in Printing Apparatus

The CPU 111 or image processing accelerator 109 of the printing apparatus 108 performs an image-data analyzing process 203 (see FIG. 3). At the image-data analyzing process 203, the image data in the PDL format is read sequentially from the data buffer RAM 112. The CPU 111 or image processing accelerator 109 interprets the drawing commands included in the PDL data and rasterizes the image data in the PDL format (PDL data) into raster image data in the same format as bitmap. The raster image data thus rasterized is stored in the data buffer RAM 112.

Then, the CPU 111 or image processing accelerator 109 performs a color conversion process 204 and a halftoning process 205 on the inputted print data.

The color conversion process 204 is a process for converting the print data into image data composed of the color signals of the inks used in the printing apparatus 108. For example, in a case when the inputted print data includes image data expressing an image, and the image data expresses the image using color space coordinates, such as sRGB, which is the presentation colors of a monitor, the color coordinates (R, G, B) of the sRGB are converted into color data (C, M, Y, K) of the inks used in the printing apparatus. The conversion method can be implemented using known approaches such as a matrix calculation process or a process using a three-dimensional look up table (LUT). Since the printing apparatus 108 in this example uses black (K), cyan (C), magenta (M), and yellow (Y) inks, the image data of RGB signals is converted into image data of 8-bit color signals of K, C, M, and Y. Each color signal of an ink means the amount of the ink to be applied. The number of ink colors is not limited to the four colors of K, C, M, and Y. In the case when to improve the image quality of printed images, other inks are used, such as light cyan (Lc), light magenta (Lm), gray (Gy), and the like, which have low color densities, the color signals corresponding to those inks are generated.

Then, the CPU 111 or image processing accelerator 109 performs the halftoning process 205 on the image data including the color signals subjected to the color conversion process 204. This halftoning process 205 is a process for decreasing the number of levels of tone in the image data. In this example, the halftoning process 205 is performed on every pixel using a dither matrix having an array of thresholds to be compared to values in the image data. This halftoning process 205 eventually generates binary data indicating whether to form an ink dot for each pixel. In the case when a multi-pass printing method described later is employed, in order to generate data corresponding to a thinned image for each printing scan, a process for thinning the image is performed on the data after the halftoning process, using a mask pattern, or the like. Use of the image processing accelerator 109 enables the process to be executed at a high speed.

A print-data generation process 206 generates print data by adding print control information to the print image data composed of 1-bit dot data. The generated print data is stored in buffer RAM 112. The binary print data stored in the buffer RAM 112 is read sequentially and inputted into a head driving circuit 207 by the CPU 111. The 1-bit print data for each ink color inputted into the head driving circuit 207 is converted into drive pulses for driving the print head 3, and the print head 3 is driven based on the drive pulses by the head driving circuit 207 to eject ink at specified timings.

5. Rasterization Process

FIG. 6 is an explanatory diagram for combinations of basic lines having specified widths, used in CAD drawings. Thin lines, thick lines, and extra-thick lines whose line widths are in the ratio of 1:2:4 are used as the basic lines. For example, in the case when the thin line is 0.25 [mm], the thick line is 0.50 [mm], and the extra-thick line is 1.00 [mm].

FIG. 6 also shows combinations of basic lines for the case when the width of the basic thin line is 0.18 [mm], 0.13 [mm], or 0.09 [mm].

The CPU 111 of the printing apparatus 108 continues image processing on raster image data generated by analysis and rasterization. In this example, the image-data analyzing process 203 performs line-width adjustment, simultaneously with the rasterization, for absorbing the difference between input line widths [mm] and line widths printed by the printing apparatus 108. Such adjustment may be performed in the image processing apparatus. Details of a method of adjusting line widths will be described later.

6. Cause of Occurrence of Difference in Line Width

The ink droplet size of the printing apparatus 108 in this example is 4 [pl], and an ink dot formed on a print sheet, which is a print medium, expands due to ink bleeding to a diameter of 35 μm. The ink droplet size of the target printing apparatus 116 is 6 [pl], and an ink dot formed on a print sheet, which is a print medium, expands due to ink bleeding to a diameter of 50 μm. Accordingly, a minimum width (minimum line width) of a line that can be printed is larger for the target printing apparatus 116 than for the printing apparatus 108. Specifically, in the case when a line is printed based on the same line drawing data, the difference in the ink-dot diameter between the printing apparatuses 108 and 116 will cause the difference in the width of the printed line (reproduced line width).

The difference in reproduced line width described above is not 15 μm (=50 μm−35 μm) for lines with all kinds of widths. The magnitude of the difference varies depending on inputted line drawing data. Hereafter, ink bleeding, which varies depending on the line width (how the line width increases), will be described with reference to FIGS. 7A to 7D.

Figure 7A:
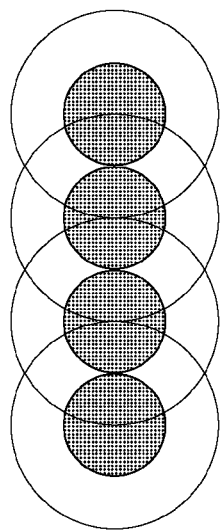
FIGS. 7A, 7B, and 7C are explanatory diagrams respectively illustrating ink bleeding for the cases of 1-pixel line, 2-pixel line, and 3-pixel line.
Figure 7B:
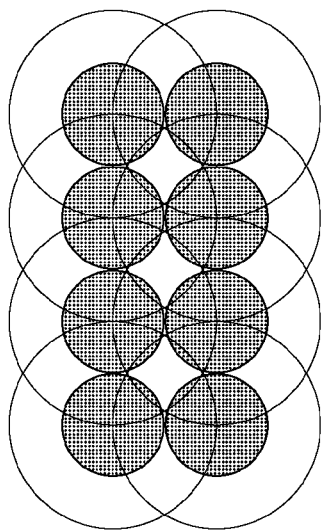
Figure 7C:
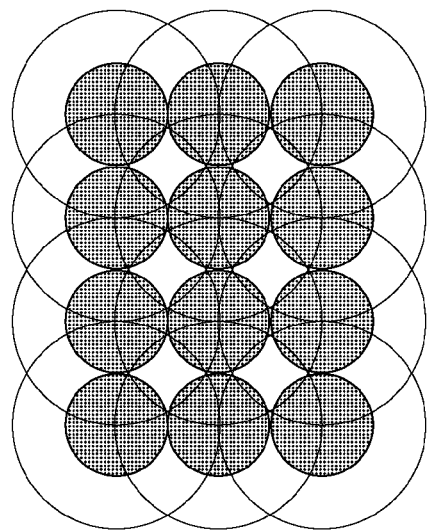

FIGS. 7A, 7B, and 7C are explanatory diagrams respectively illustrating ink bleeding for the cases of 1-pixel line, 2-pixel line, and 3-pixel line printed on a print medium. In these figures, the circles filled with gray indicate the size of dots at the time when ink droplets have just landed, and the unfilled circles indicate the size of dots after bleeding. In the case of 1-pixel line, the line thickens due to bleeding on both sides. In the case of 2-pixel line, the line thickens in the same manner, but the influence of bleeding is smaller. For example, for the left pixels in FIG. 7B, the dots expand to the left due to bleeding, but for the right sides of the dots where next dots are located, the expansion due to new bleeding is small. In the same manner, for the right pixels in FIG. 7B, the dots expand to the right due to bleeding, but for the left sides of the dots where next dots are located, the expansion due to new bleeding is small. The same is true of the case of the 3-pixel line. In particular, for the center pixels in FIG. 7C, the bleeding does not affect the increase in line width because there are other dots on both sides.

Figure 7D:
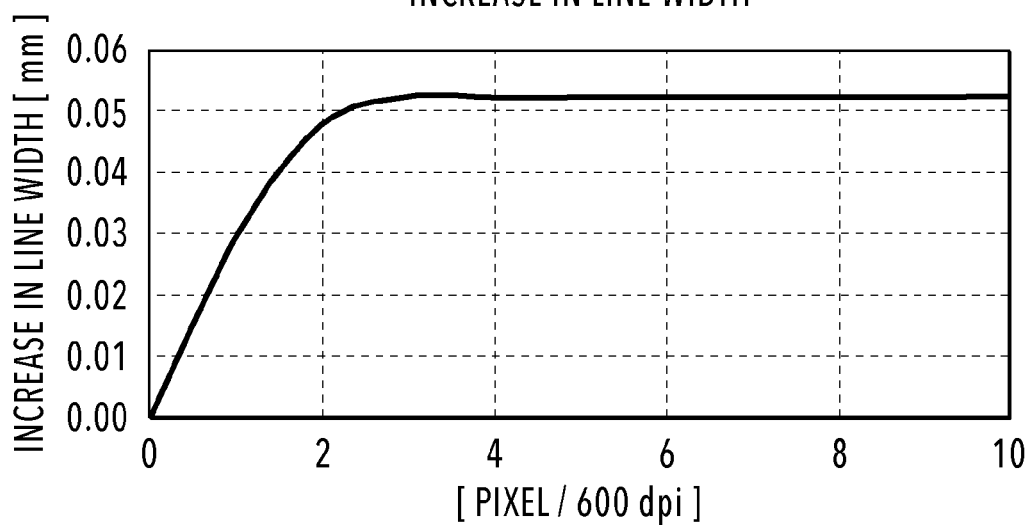
FIG. 7D is an explanatory diagram for the relationship between the line width and the change in line width due to ink bleeding.

FIG. 7D is an explanatory diagram for the relationship between the line width in pixels for the case when the resolution of rasterization is 600 [dpi] and the increase in line width due to bleeding of dots. As illustrated in FIGS. 7A and 7B, the line width increases from one pixel to two pixels due to ink bleeding. However, since ink bleeding influences the outside of a line, in the case of a line of three or more pixels, the increase in line width due to ink bleeding is approximately the same (substantially the same). Hence, the way of ink bleeding is different depending on the line width corresponding to inputted image data, and, as a result, the way of increase in line width is different.

Thus, depending on the line width (input line width) corresponding to inputted image data, the amount of ink bleeding (the amount of increase in line width) is different. For this reason, in the present embodiment, in light of the influence of ink bleeding corresponding to input line width, a line-width detection image is printed by the printing apparatuses 108 and 116 to detect the widths of lines printed by those printing apparatuses.

7. Process of Setting Line-Width Adjustment Value

Figure 8:
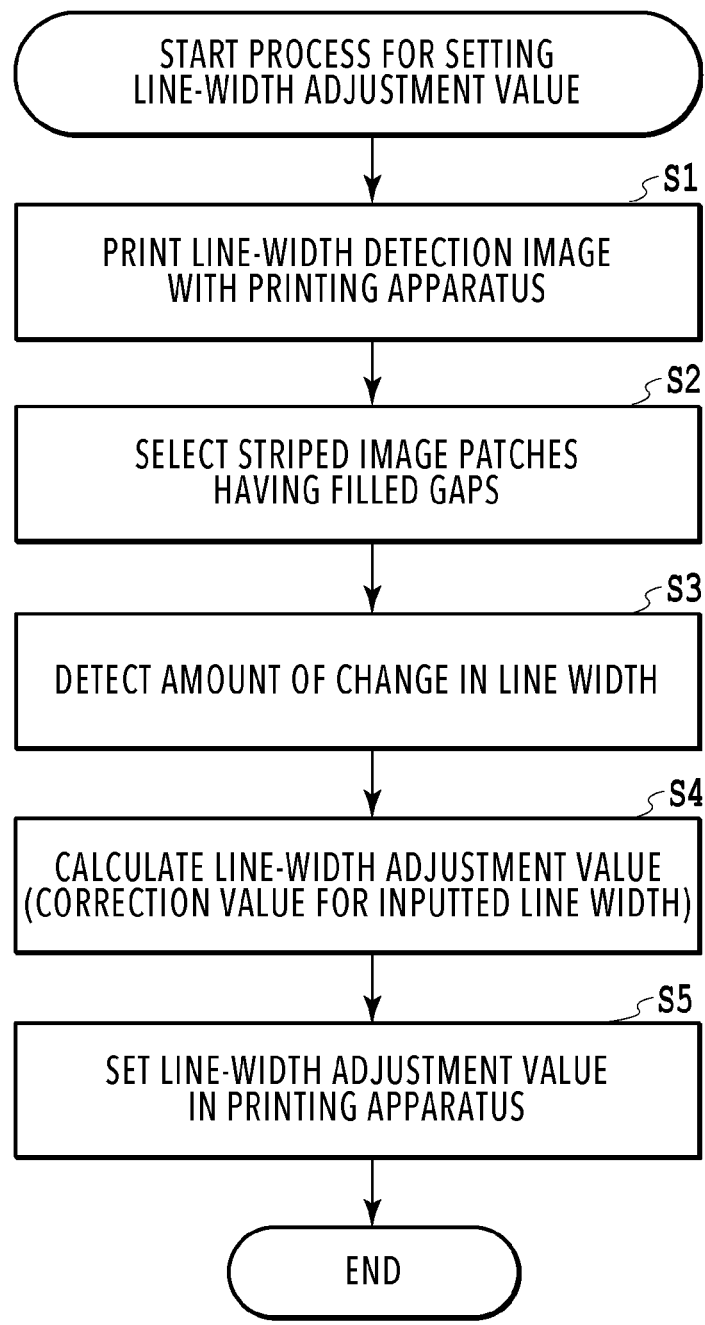
FIG. 8 is a flowchart for explaining a process of setting line-width adjustment values.

FIG. 8 is a flowchart for explaining a process of setting line-width adjustment values based on the print result of a line-width detection image. In the present embodiment, the widths of lines that have printed by the target printing apparatus (target printer) 116 are set as target widths, and the widths of lines to be printed by the printing apparatus 108 are adjusted so that lines having the widths adjusted to the target widths can be printed by the printing apparatus 108, as described later. Note that the symbol "S" in description for each process means a step.

First, the CPU 102 transmits the image data of a line-width detection image from the image processing apparatus 101 to the printing apparatus 108 and the target printing apparatus 116, those printing apparatuses 108 and 116 print the line-width detection image based on the image data (S1). In some embodiments, the image data for printing the line-width detection image may be generated by the printing apparatuses 108 and 116 instead of by the image processing apparatus 101. The timings when the line-width detection images are printed by the printing apparatuses 108 and 116 do not need to be the same. In the present embodiment, the widths of lines to be printed by the printing apparatus 108 are adjusted to the widths of lines printed by the target printing apparatus 116. In this case, the result of printing the line-width detection image by the target printing apparatus 116 needs to be obtained (obtaining information on the print result) before obtaining the one by the printing apparatus 108. The line-width detection image is an image for detecting characteristics of line widths printed by the printing apparatuses 108 and 116 as the amount of change in line width.

Figure 9:
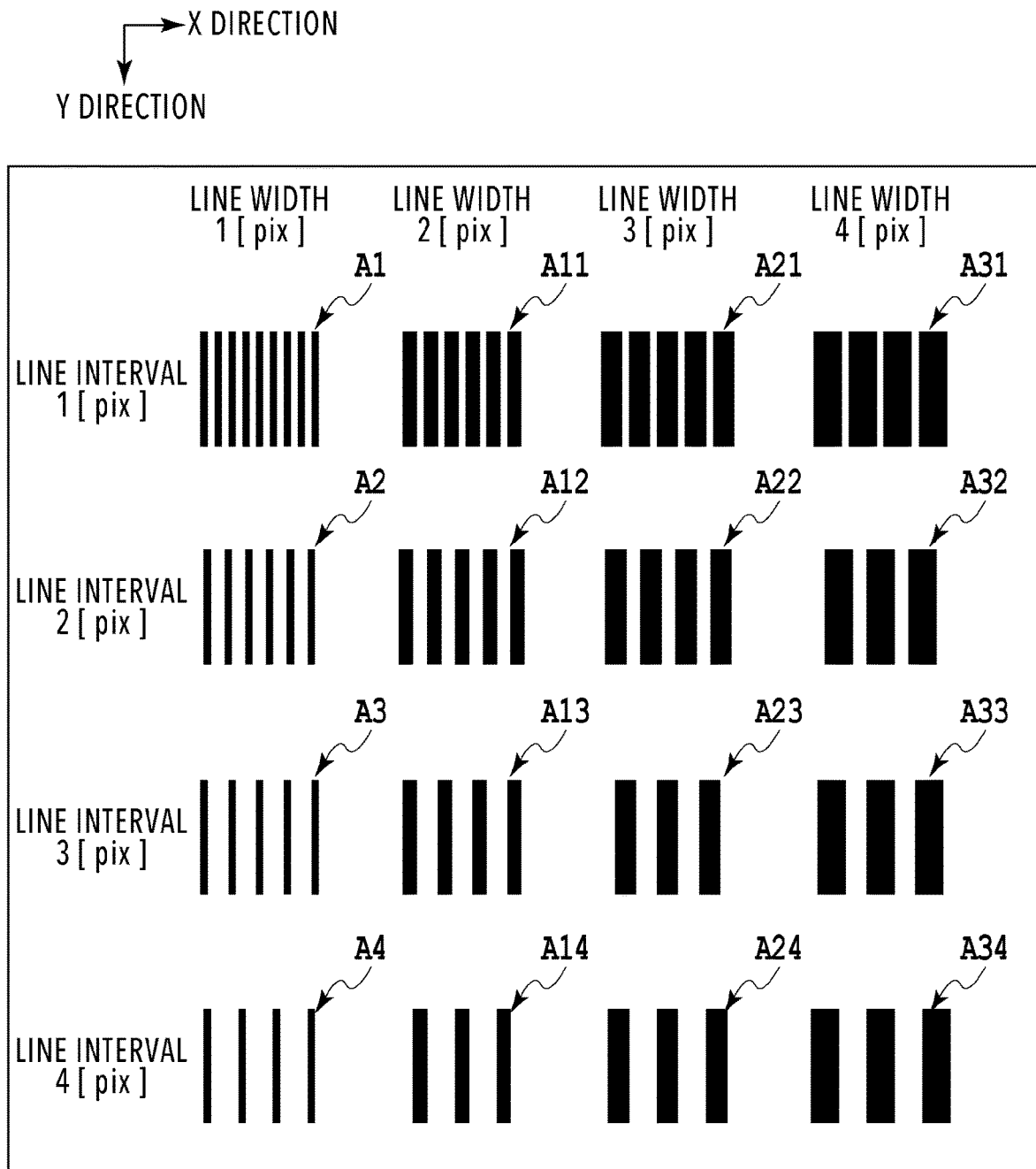
FIG. 9 is an explanatory diagram for a line-width detection image of raster data.
Figure 10:
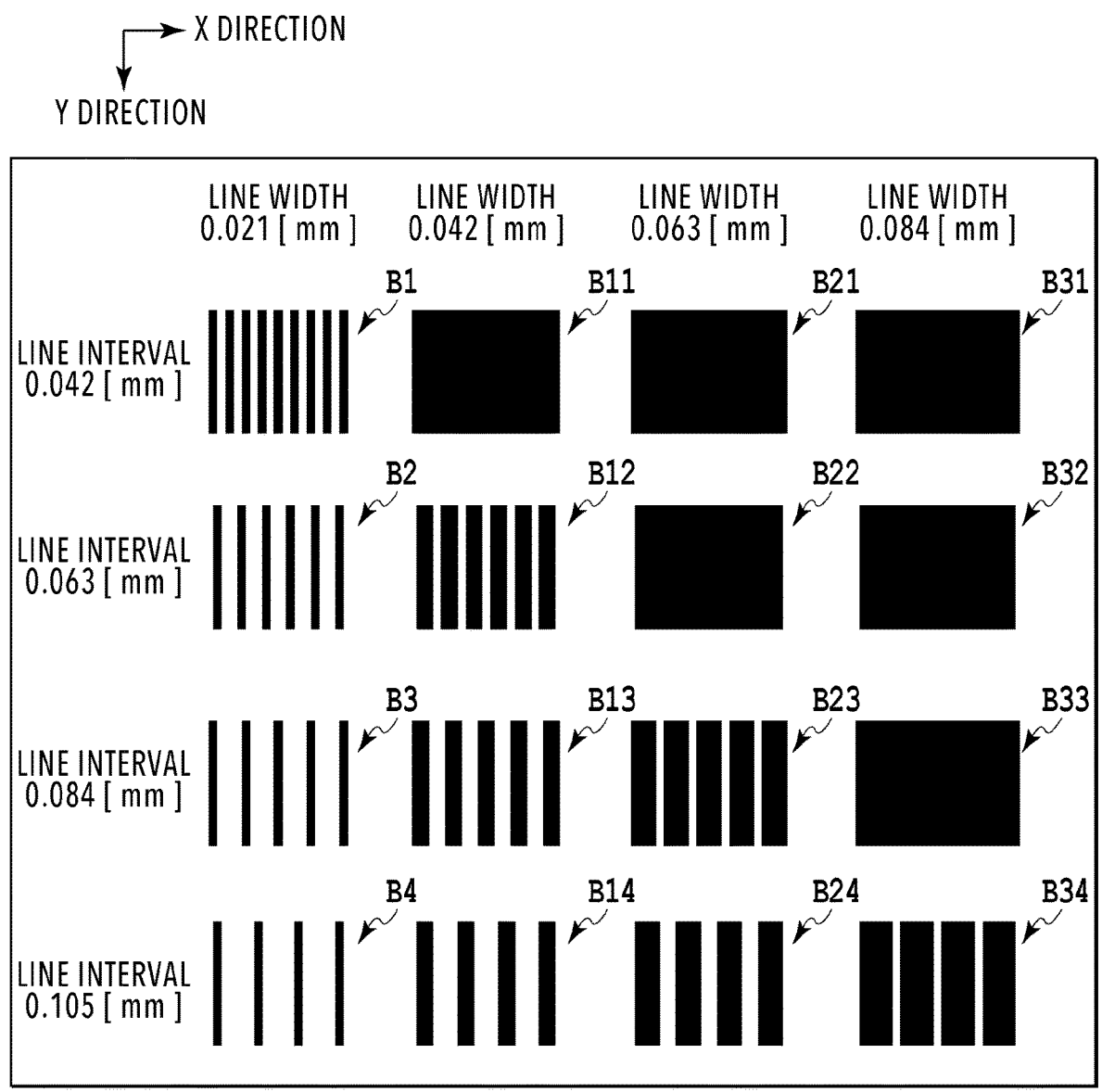
FIG. 10 is an explanatory diagram for a line-width detection image of vector data.

FIGS. 9 and 10 are diagrams for explaining examples of line-width detection images. There are two kinds of line-width detection images of the image data of a line-width detection image in a raster format and the image data of a line-width detection image in a vector format, as below. Both of the line-width detection images printed by the printing apparatuses 108 and 116 are the line-width detection images of raster data, or both of them are the line-width detection images of vector data. The line-width detection image of the present embodiment includes multiple striped rectangular images, each having different frequency characteristics (hereinafter, also referred to as a "striped image patch"). In each of the multiple striped image patches, multiple lines extending in the Y direction are arranged in the X direction as illustrated in FIGS. 9 and 10. The multiple lines arranged in a striped pattern included in one patch have the same width in the X direction. Between the patches, at least one of the width of lines and the interval between the lines is different, so that from the print results, the way of ink bleeding (the amount of increase in line width) is detected.

7-1. Line-Width Detection Image of Raster Data

FIG. 9 is an explanatory diagram for a line-width detection image of raster data. The total number of striped image patches included in the line-width detection image in this example is sixteen. Patches including lines having different widths in the X direction are lined in the X direction (horizontal direction), and patches having lines arranged at different intervals (arrangement pitch) are lined in the Y direction (vertical direction). Hence, the widths in the X direction of multiple lines included in each of the striped image patches lined in the Y direction are the same. Also, the intervals of the lines included in each of the striped image patches lined in the X direction are the same. The interval of lines means the distance between the center coordinates in the X direction of two lines adjacent in the X direction. Specifically, striped image patch A1 includes multiple lines, each having a line width of one pixel, arranged at intervals of one pixel; striped image patch A2 includes multiple lines, each having a line width of one pixel, arranged at intervals of two pixels. Striped image patch A3 includes multiple lines, each having a line width of one pixel, arranged at intervals of three pixels; striped image patch A4 includes multiple lines, each having a line width of one pixel, arranged at intervals of four pixels. The intervals between lines arranged in the X direction gradually increase in the order of striped image patches A1, A2, A3, and A4 lined in the Y direction. In the same manner, for striped image patches A11, A12, A13, and A14 each including multiple lines having a line width of two pixels, the intervals between the lines arranged in the X direction increases from one, two, three, and four pixels in the order from top to bottom in the Y direction. The same is true of striped image patches A21, A22, A23, and A24 each including multiple lines having a line width of three pixels and striped image patches A31, A32, A33, and A34 each including multiple lines having a line width of four pixels. As described above, in the image data of the line-width detection image in the present embodiment, the lines having different widths in the X direction are arranged in the X direction. Then, the striped image patches having different intervals (patch group) are lined in the Y direction for each line width. Here, A1, A2, A3, and A4 are called a first patch group; A11, A12, A13, and A14, a second patch group; A21, A22, A23, and A24, a third patch group; and A31, A32, A33, and A34, a fourth patch group.

Figure 11A:
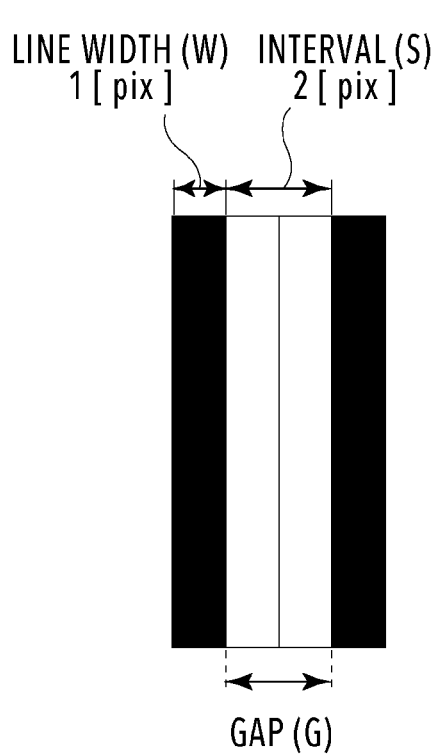
FIG. 11A is a partially enlarged view of the line-width detection image of raster data.

In the case of raster data, gap G in the X direction between lines is defined by the number of pixels corresponding to interval S of adjacent two lines as illustrated in FIG. 11A. In the case when the line-width detection image of raster data as described above is printed by the printing apparatuses 108 and 116, the increase in line width can be detected by the gaps between lines being filled according to the increase in line width due to ink bleeding, as described later.

7-2. Line-Width Detection Image of Vector Data

FIG. 10 is an explanatory diagram for a line-width detection image of vector data. The total number of striped image patches included in the line-width detection image in this example is sixteen. Patches including lines having different widths are lined in the X direction (horizontal direction), and patches having different intervals between lines are lined in the Y direction (vertical direction). Specifically, in striped image patch B1, multiple lines having a line width of 0.021 mm are printed at intervals of 0.042 mm; in striped image patch B2, multiple lines having a line width of 0.021 mm are printed at intervals of 0.063 mm. In striped image patch B3, multiple lines having a line width of 0.021 mm are printed at intervals of 0.084 mm; in striped image patch B4, multiple lines having a line width of 0.021 mm are printed at intervals of 0.105 mm. The intervals between lines gradually increase in the order of striped image patches B1, B2, B3, and B4. In striped image patch B11, multiple lines having a line width of 0.042 mm are printed at intervals of 0.042 mm; in striped image patch B12, multiple lines having a line width of 0.042 mm are printed at intervals of 0.063 mm. In striped image patch B13, multiple lines having a line width of 0.042 mm are printed at intervals of 0.084 mm; in striped image patch B14, multiple lines having a line width of 0.042 mm are printed at intervals of 0.105 mm. The same is true of striped image patches B21, B22, B23, and B24 including multiple lines having a line width of 0.063 mm and striped image patches B31, B32, B33, and B34 including multiple lines having a line width of 0.084 mm.

Figure 11B:
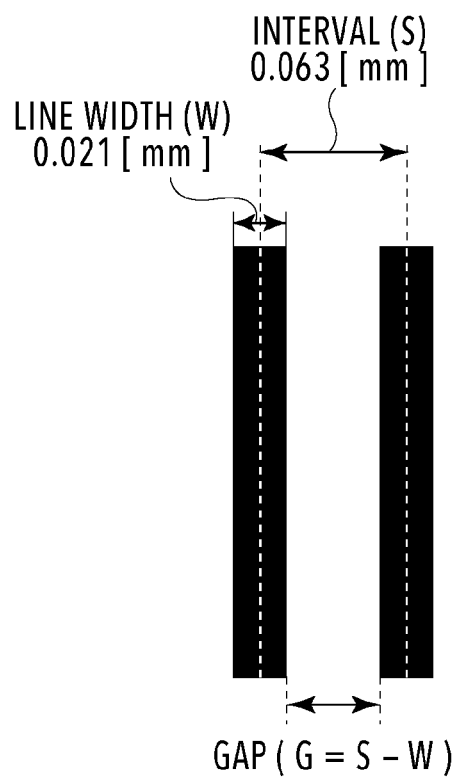
FIG. 11B is a partially enlarged view of the line-width detection image of vector data.

In the case of vector data, gap G between lines is defined as the distance obtained by subtracting line-width W from interval S between adjacent two lines as illustrated in FIG. 11B. In FIG. 10, striped image patches B11, B21, B22, B31, B32, and B33 whose line widths are larger than intervals S look solid images without gaps G, but they are actually sets of multiple lines.

7-3. Selection of Striped Image Patches

Returning to the flowchart of FIG. 8, out of the striped image patches in the line-width detection images printed by the printing apparatuses 108 and 116, the striped image patches in which adjacent two lines have joined and filled gaps G and paper-white areas have disappeared are selected (S2). The filled Gaps G are caused by line-width change factors such as large ink-dot diameters and ink bleeding.

Figure 12:
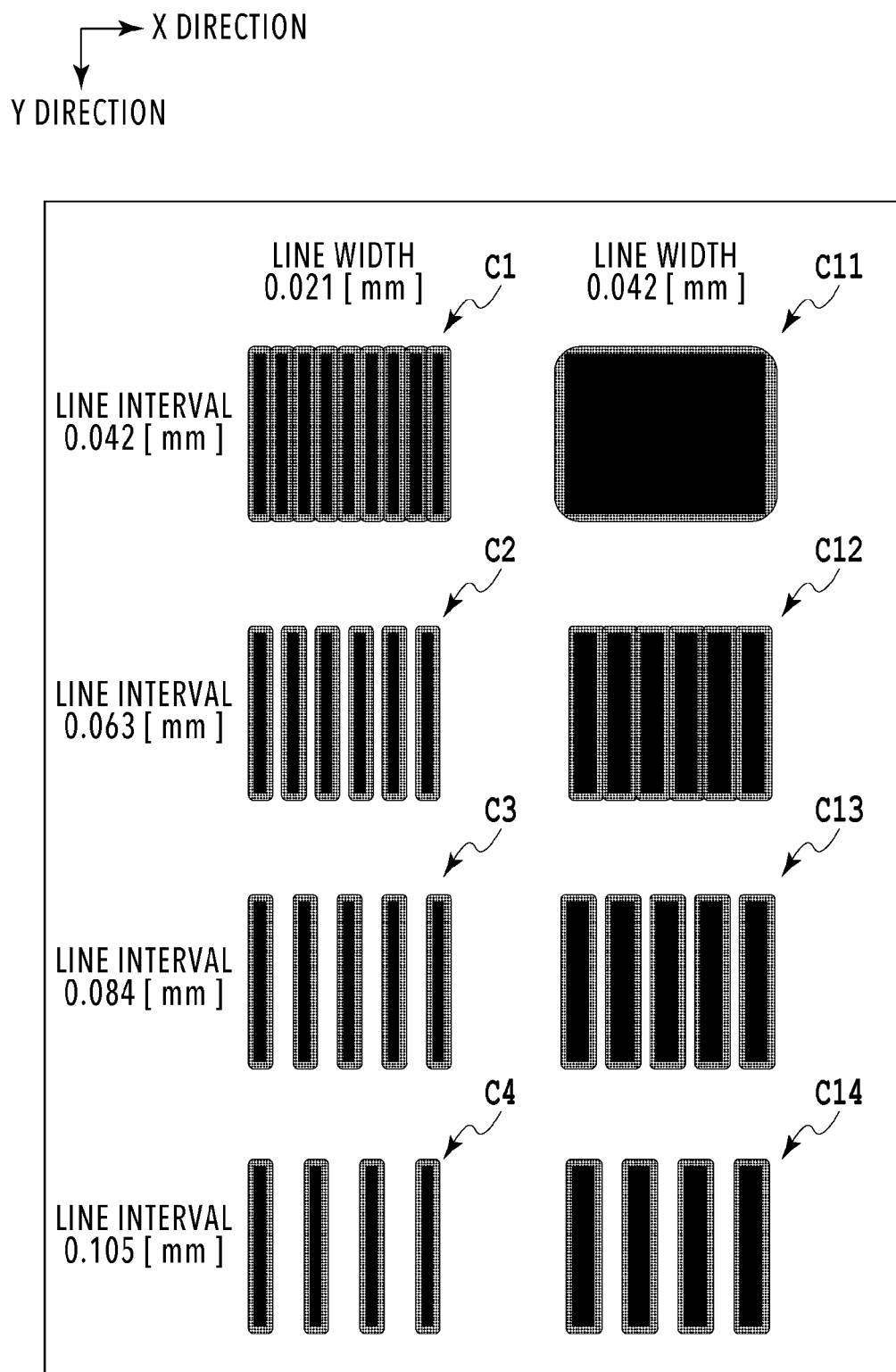
FIG. 12 is an explanatory diagram for a result of printing a line-width detection image.

For example, in a line-width detection image as illustrated in FIG. 12, paper-white areas, which are gaps between adjacent lines, are not seen in striped image patches C1, C11, and C12, and paper-white areas, which are gaps, are seen in the other striped image patches. Thus, striped image patches C1, C11, and C12 are selected at S2. This selection is, for example, executed by the user on a selection screen displayed in the image processing apparatus 101. The user can easily perform selection as above by visually checking whether gaps in a striped image patch are filled. Each of the striped image patches may be associated with a symbol (a number in the present embodiment), and the user may select and input the numbers. In this case, the selected numbers may be inputted to the image processing apparatus 101 or may be inputted to the printing apparatus 108 or 116 that printed the line-width detection image.

As described above, in the line-width detection image of the present embodiment, the degrees of line-width variations are set such that the line-width detection image includes both the striped image patches in which paper-white portions are not seen and the striped image patches in which paper-white portions are seen. The former striped image patches are striped image patches in which due to the change in the widths of lines printed by a printing apparatus, the intervals between adjacent two lines are filled with ink and paper-white portions are not seen. The latter striped image patches are striped image patches in which in spite of the change in the widths of lines printed by the printing apparatus, the intervals between adjacent two lines are not filled with ink and paper-white portions are seen. As a result, the relationship between the distance of the interval with which the change in line width makes the paper-white areas disappear and the distance of the interval with which in spite of the change in line width the paper-white areas do not disappear makes it possible to provide information on the widths of lines printed by the printing apparatus, as described later.

7-4. Detection of Amount of Change in Line Width

Next, the amount of change in line width is detected based on the striped image patches selected as described above (S3).

Figure 13A:
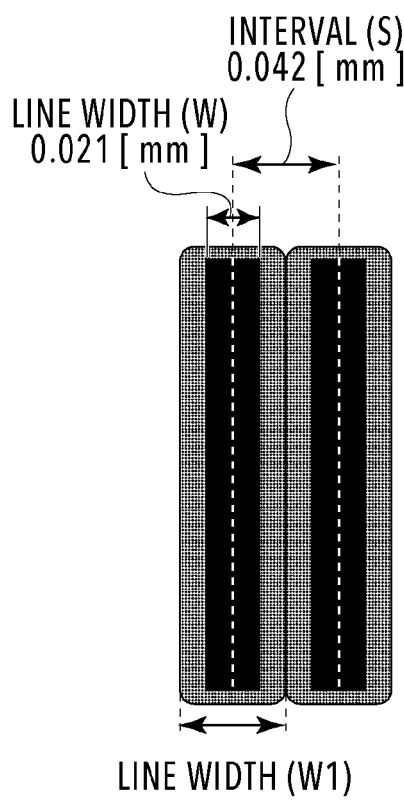
FIGS. 13A and 13B are partially enlarged views of different line-width detection images in FIG. 12.
Figure 13B:
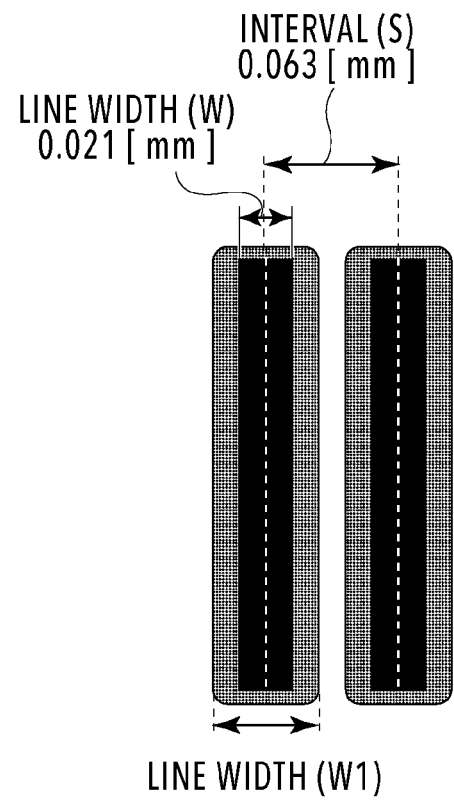

For lines having a line width of 0.021 mm in FIG. 12, in striped image patch C1 (which was selected at S2) having intervals of 0.042 mm, gaps are filled and there is no paper-white portion; in striped image patches C2, C3, and C4 having intervals of more than 0.042 mm, gaps are not filled, and there are paper-white portions. FIG. 13A is an enlarged view of part of striped image patch C1; FIG. 13B is an enlarged view of part of striped image patch C2. For the lines in striped image patch C1, both sides of the lines expand outside due to ink bleeding, and from the relationship with the intervals (0.042 mm, 0.063 mm), it can be detected that the line-width W1 is 0.042 mm or more and less than 0.063 mm. In this example, the average value 0.053 (=(0.042+0.063)/2) [mm] of those intervals (0.042 mm, 0.063 mm) is taken as the detection result of line-width W1. Thus, it is detected that the amount of change in the width of lines having a line width 0.021 mm is 0.032 (=0.053−0.021) [mm]. For lines having a line width of 0.042 mm in FIG. 12, in striped image patches C11 and C12 (which were selected at S2), gaps are filled and there is no paper-white portion; in striped image patches C13 and C14, gaps are not filled and there are paper-white portions. Hence, for the lines with a line width of 0.042 mm, the line width increased from 0.042 mm to 0.084 mm due to ink bleeding. Thus, it is detected that the amount of change in the width of lines having a line width 0.042 mm is 0.042 mm.

7-5. Calculation of Line-Width Adjustment Value

After the amount of change in the line widths of lines printed by the printing apparatuses 108 and 116 are detected as described above, line-width adjustment values are calculated based on the amount of change (S4).

To absorb the difference between the line widths of lines printed by the target printing apparatus 116 and the line widths of lines printed by the printing apparatus 108, the printing apparatuses 108 and 116 perform, at the image-data analyzing process 203 in FIG. 3, line-width adjustment simultaneously with image rasterization in the rasterization process. Specifically, line widths are controlled by adjusting values of specified values [mm] that specify the line widths in the PDL format. Line widths (input line widths) are set in the PDL format, and the printing apparatuses 108 and 116 print lines based on the set line widths. The widths of the printed lines (output line widths) are detected as described above.

Figure 14:
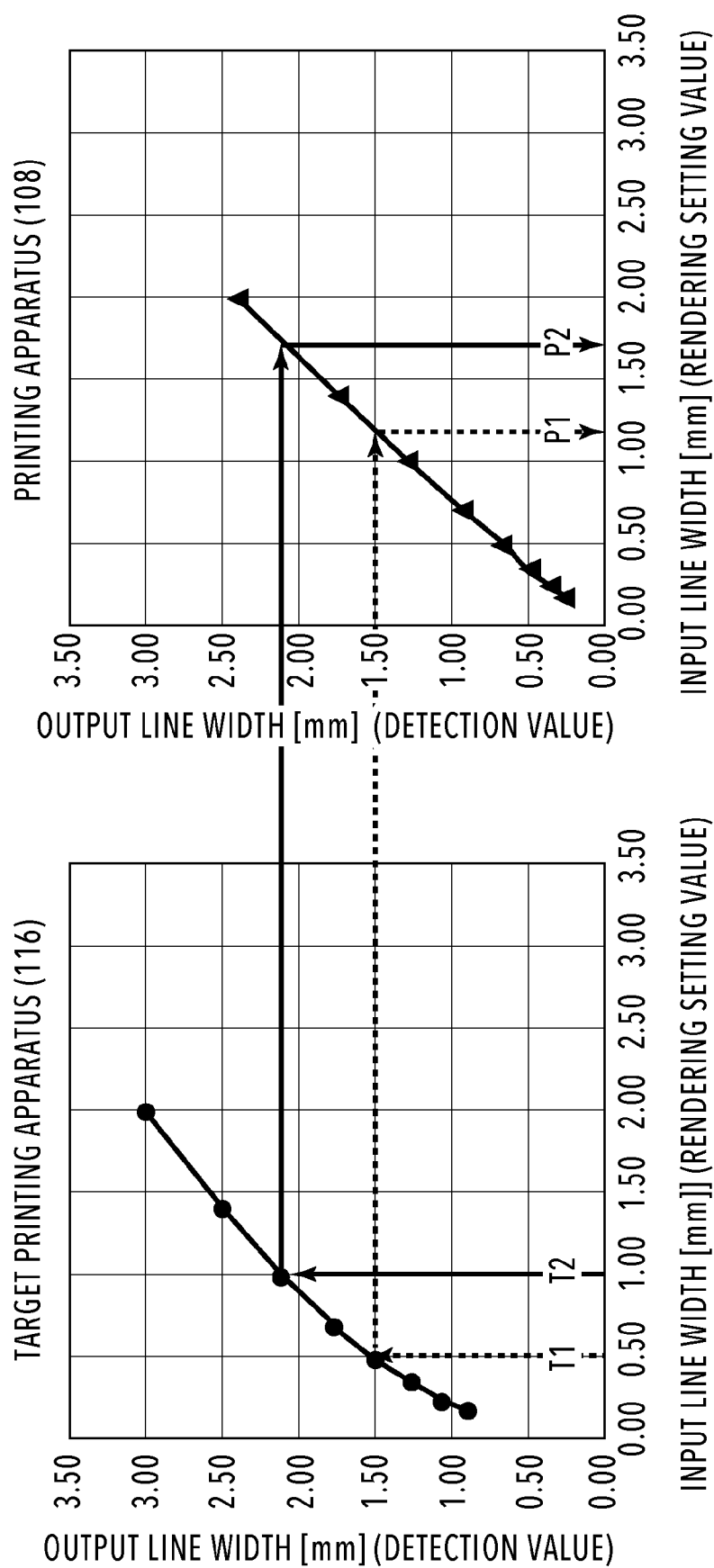
FIG. 14 is an explanatory diagram for a method of calculating line-width adjustment values.

FIG. 14 is an explanatory diagram for the relationship between the input line widths [mm] set in the PDL format and the detection values [mm] of the widths of the lines outputted by the printing apparatuses 108 and 116. In this example, in the case when the input line width is set to T1 (=0.50 [mm]), the detection value of the output line width of the target printing apparatus 116 is 1.50 [mm]. The input line width in the printing apparatus 108 for achieving this output line width 1.50 [mm] in printing in the printing apparatus 108 is determined to be P1=1.19 [mm] from the relationship between the input line width and the output line width of the printing apparatus 108 as indicated by the dotted-line arrows in FIG. 14. In addition, in FIG. 14, in the case when the input line width is set to T2 (=1.00 [mm]), the detection value of the output line width of the target printing apparatus 116 is 2.20 [mm]. The input line width in the printing apparatus 108 for achieving this output line width 2.20 [mm] in printing in the printing apparatus 108 is determined to be P2=1.74 [mm] from the relationship between the input line width and the output line width in the printing apparatus 108 as indicated by the solid-line arrows in FIG. 14.

FIG. 15 shows a specific example of input line widths set in the PDL format, the detection values [mm] of the output line widths in the printing apparatuses 108 and 116, and the input line widths after correction in the printing apparatus 108. As in this example, in the case when the widths of lines to be printed by the printing apparatus 108 are adjusted to the widths of lines printed by the target printing apparatus 116, the input line widths after correction in the printing apparatus 108 can be determined as in FIG. 15.

7-6. Setting of Line-Width Adjustment Values

After the line-width adjustment values corresponding to the input line widths after correction are calculated as described above, these adjustment values are set in the printing apparatus (S5). In the case when the image processing apparatus 101 calculates line-width adjustment values, the image processing apparatus 101 sets the adjustment values in the printing apparatus 108 or 116 that is the adjustment target. In the case of this example, since the widths of lines to be printed by the printing apparatus 108 are adjusted to the widths of lines printed by the target printing apparatus 116, the line-width adjustment values are set in the printing apparatus 108. In this case, a printer command between the image processing apparatus 101 and the printing apparatus 108 may be used, or setting information may be added to print data generated in the image processing apparatus 101. In the case of using a printer command or in the case when line-width adjustment values are calculated in the printing apparatus 108, the line-width adjustment values are stored in the printing apparatus 108.

8. Form of Striped Image Patch

It is desired that the size of a striped image patch (hereafter referred to as the "patch size") be a size larger than or equal to the least common multiple of the rounding frequency of the rasterization.

Figure 16:
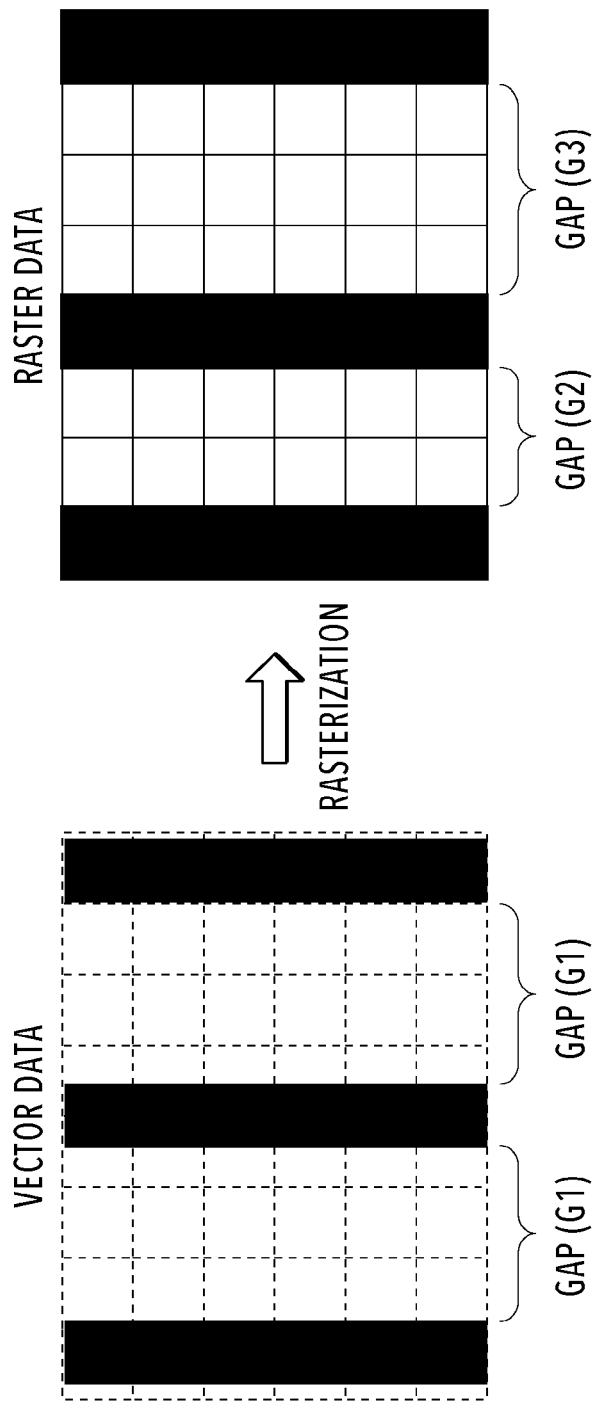
FIG. 16 is an explanatory diagram for a rounding error in a rasterization process.

FIG. 16 is an explanatory diagram for the change in line intervals that may occur in the case when print data is vector data and the data is converted from vector data to raster data. For example, assume that line-interval G1 in vector data, in which the positions of lines are defined by the distances (mm), needs to be expressed using a 2.4-pixel interval in raster data. In this case, the positions, intervals, and widths of lines are expressed by the pixel in raster data. For this reason, there is a possibility that the intervals of lines in raster data are different as G2 and G3 depending on the positions of adjacent lines due to the rounding errors (errors due to one of rounding down, rounding up, and rounding off) in the positions, intervals, and widths of those lines. To address this, the number of lines is set to a specified number or more, in other words, the patch size is set to the rounding frequency or more, so that a different interval pattern can be averaged. Specifically, the number of lines is set to a number larger than or equal to [{the least common multiple of (line width+interval) and (1 pixel width)}±1 pixel width]. As just described, the size in the X direction of a striped image patch is set larger than or equal to the least common multiple of the sum of one line width and one interval and one pixel width corresponding to the resolution of rasterization of the printing apparatus. Specifically, a patch size and the number of lines can be determined using the formula below.

In the case when GCD is the greatest common divisor of (line width+interval) and (one pixel width), the patch size corresponds to the least common multiple LCM of (line width+interval) and (one pixel width), and the least common multiple LCM and the greatest common divisor GCD have the relationship expressed by the following formula 1.

$$\text{patch size} = \text{LCM} = (\text{line width}+\text{interval}) \times (1 \text{ pixel width}) \div \text{GCD} \qquad (1)$$

The number of lines has the relationship expressed by the following formula 2 with the least common multiple LCM and the greatest common divisor GCD.

$$\text{the number of lines} = \text{LCM} \div (1 \text{ pixel width}) = (\text{line width}+\text{interval}) \div \text{GCD} \qquad (2)$$

Here, (one pixel width) is 21 μm in the case when the resolution is 1200 dpi, 42 μm for the resolution 600 dpi, and 84 μm for the resolution 300 dpi.

The greatest common divisor GCD can be determined using "Euclidian algorithm". The sizes and the numbers of lines may be calculated from various combination patterns of line widths and intervals, and the patch size may be set to the largest size, and the number of lines in a striped image patch may be set to the largest number of lines. However, it is not practical to set the patch size and the numbers of lines from the combinations of all the values of finite decimal numbers.

Specifically, a description will be made of the least common multiple LCM for the resolution 600 dpi in which one pixel width is 42 μm.

In the case when the line width is 0.025 mm, and the line interval is 0.050 mm, the least common multiple (1 cycle) is 3.15 mm. In the case when the line width is 0.050 mm, and the line interval is 0.050 mm, the least common multiple (1 cycle) is 2.10 mm. In the case when the line width is 0.050 mm, and the line interval is 0.075 mm, the least common multiple (1 cycle) is 5.25 mm. Considering the combinations of these line widths and the line intervals, the size in the X direction (the direction orthogonal to the extending direction of lines) may be 5.25 mm, which is the largest size, or it may be larger than or equal to a size that can include the least common multiple of these (for example, 1 cm).

Meanwhile, it is desired that the patch size be smaller to make moire less noticeable.

In general, highly periodic patterns such as striped image patches are likely to interfere with other's frequencies and cause moire (an interference pattern). In printing apparatuses of an inkjet type, an electrophotographic type, or the like, it is difficult to avoid the occurrence of minute vibrations in printing. For this reason, there is a possibility that moire occurs in striped image patches as in this example due to vibrations in print operation. Moire has a long cycle and thus very noticeable in terms of the characteristics of the human's sense of sight. In the case when the size of striped image patches is too large, the gaps between lines may be filled because of the influence of moire having a long cycle.

Mechanical cycles of the printing apparatus is affected by, for example, the lengths of the outer circumferences and the numbers of teeth of gears included in the driving system for the print head of the inkjet printing apparatus, and may cause moire having a cycle of 5 cm, or the like. Since mechanical vibrations of the printing apparatus occur in both the X direction and the Y direction, moire occurs in both the X direction and the Y direction. If moire is only for one cycle, it is less likely to be visually recognizable. However, since the characteristics of the human's sense of sight are sensitive to cycles of several centimeters, in the case when a moire pattern having a cycle of several centimeters is repeated several times in a patch size of 10 cm, the moire will be highly noticeable. For this reason, to make the number of cycles of moire within two, the patch size should preferably be approximately 5 cm or less in both the X direction and the Y direction. Further, considering the accuracy in print operation in the printing apparatus, striped image patches should preferably be printed around the center of the printable area of a print medium, where the accuracy is high.

In addition, the patch size of multiple striped image patches should preferably be approximately the same (substantially the same) in both the X direction and the Y direction. The patch size should preferably be approximately the same (substantially the same) at least in the X direction.

In this case, the number of lines included in each striped image patch does not need to be the same.

For example, in the case when a striped image patch group is configured such that the number of lines in each of the multiple striped image patches is the same, the patch size in the X direction will vary depending on the line width and the interval. To visually perform macroscopic detection of the densities of striped image patches and microscopic detection of the gaps between lines in striped image patches, simultaneously, it is desired that the patch sizes be uniform. Different patch sizes may induce erroneous recognition in such visual observation. In the case when the lines included in each striped image patch are set the same, patches having different intervals between adjacent lines will have different patch sizes in the X direction. For example, a striped image patch including four lines with small intervals in between and a striped image patch including four lines with large intervals in between will have different widths in the X direction. In this case, when the user observes the patches visually, the densities that the user visually feels are different. The density of the striped image patch that has small intervals and the size of which in the X direction is small will look relatively high, and the density of the striped image patch that has large intervals and the size of which in the X direction is large will look relatively low. Hence, in image data of a line-width detection image in the present embodiment, the size in the X direction of each striped image patch is set approximately the same (substantially the same). Specifically, a specified threshold in the X direction is set, and lines in a number within the threshold are printed as striped image patches.

In addition, for striped image patches having the same density, the one having a larger area is recognized to have a higher density. The larger area a patch has, the more easily the gaps between lines are recognized, so that the gaps between lines in a patch having a smaller area may be overlooked. In the case when the length in the Y direction of each striped image patch is different, specifically, in the case when the lengths of lines are different between patches, the densities are observed to be different between the patches for the same reason as for the above example, and, thus, the images are difficult to be seen by the user. To prevent such erroneous recognition from being induced, the patch sizes of multiple striped image patches should preferably be approximately the same (substantially the same) in both the X direction and the Y direction.

Specifically, the number of lines is adjusted between multiple striped image patches having different line widths and intervals to make the patch sizes approximately the same (substantially the same), so that the change in line width due to ink bleeding can be detected reliably without inducing visual erroneous recognition. In addition, sensors can be used to perform macroscopic detection of the densities of striped image patches and microscopic detection of the gaps between lines in the striped image patches. For example, two types of sensors having different resolutions may be used. The sensor having a lower resolution may detect the densities macroscopically, and the other sensor having a higher resolution may detect gaps microscopically. It is difficult in a detection method using a single density sensor to achieve both macroscopic detection and microscopic detection. The configuration described above makes it possible to perform highly accurate detection using sensors. Also, in this case, making the sizes of multiple striped image patches uniform and arranging them in a certain form makes detection efficient.

In addition, multiple striped image patches should preferably be arranged such that the ones having the same line width and different gaps can be easily compared instead of comparing the ones having different line widths. Specifically, in the case when multiple lines in striped image patches extend in the Y direction (vertical direction), and multiple striped image patches including lines having the same line width and different gaps are lined in the Y direction, as in this example, it makes it easy to visually detect the change in line width due to ink bleeding. To visually check whether gaps between lines are filled and the paper-white portions have disappeared, it is easier to compare striped image patches adjacent in the Y direction than comparing striped image patches lined in the X direction (horizontal direction). This is because the paper-white areas, which are gaps between lines, are formed in shapes of lines extending in the Y direction.

Figure 17A:
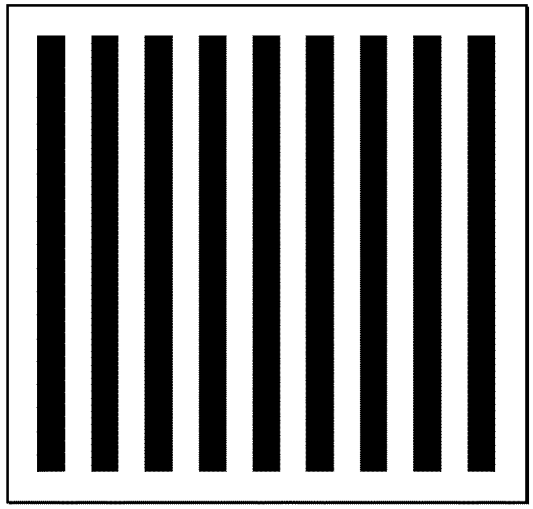
FIG. 17A is an explanatory diagram for a highly periodic striped image patch.
Figure 17B:
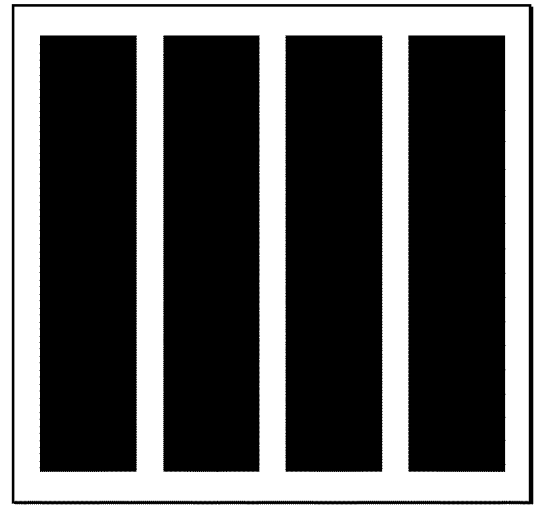
FIG. 17B is an explanatory diagram for a less periodic striped image patch.

From the above, the size of a single striped image patch should preferably be approximately 1 to 5 cm in both the X direction and the Y direction, and the sizes of all the striped image patches should preferably be approximately the same (substantially the same). Since the striped image patches in this example each have a striped pattern including three or more lines, it is possible to visually perform macroscopic detection of the densities of striped image patches and microscopic detection of gaps between lines, with high accuracy. For a striped image patch having a highly-periodic high-frequency striped pattern as illustrated in FIG. 17A, it is difficult to visually check microscopic gap of the lines, but it is easy to distinguish the change in macroscopic density in the striped image patch due to the influence of the gaps between lines. In contrast, for a striped image patch having a less periodic low-frequency striped pattern as illustrated in FIG. 17B, the density of the image looks approximately uniform (substantially uniform) from a macroscopic viewpoint, but it is easy to recognize the gaps from a microscopic viewpoint. The reason is that because the paper-white areas, which are the gaps between lines, or the areas having low density, appear in forms of lines, humans' eyes can catch the gaps with high sensitivity.

9. Line Width Correction Process

Figure 18:
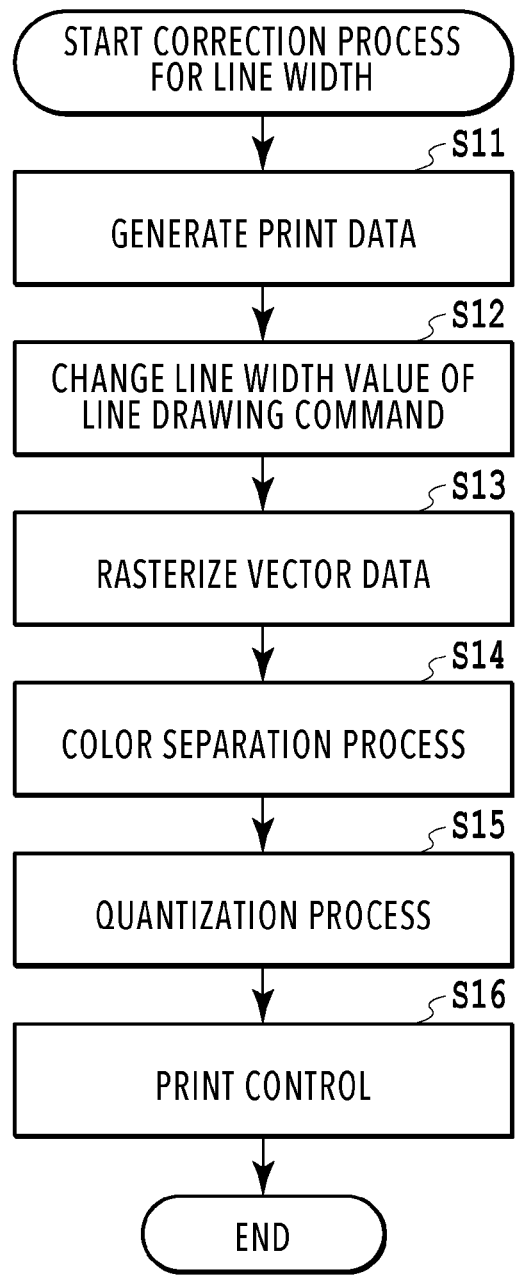
FIG. 18 is a flowchart for explaining a line-width correction process.

FIG. 18 is a flowchart for explaining a line-width correction process using line-width adjustment values.

First, the CPU 102 of the image processing apparatus 101 generates print data (S1). The print data includes information on an image to be printed, a print medium (the name of the print sheet) used for printing, the print quality grade, the size of the print medium (sheet size), whether to perform a rotation process on the image, the layout of the image, and the like. There are cases when the image to be printed is vector data and cases where it is raster data. The print data generated at the image processing apparatus 101 is transferred to the printing apparatuses 108 and 116. In the following example, a description is made of a case when an image to be printed is vector data. In addition, in the following example, a description is made of a case when the widths of lines to be printed by the printing apparatus 108 are adjusted to the widths of lines printed by the target printing apparatus 116.

The CPU 102 of the image processing apparatus 101 changes the line-width values of the line drawing command of the vector data based on the line-width adjustment values described above (S12), and, then, the CPU 102 performs a rasterization process on the vector data using a known method to generate raster data (S13). The CPU 111 or accelerator 109 of the printing apparatus 108 executes specified image processing including a color separation process (S14) for ink colors, such as C, M, Y, K, and the like, and a quantization process (S15). The printing apparatus 108 prints lines having the same widths as those of the lines printed by the target printing apparatus 116, based on the print data subjected to the image processing (S16).

As has been described above, in the present embodiment, striped image patches are printed by the printing apparatuses 108 and 116, and correction values are determined from those print results in order for the target printing apparatus 108 to print lines having the same widths as those of the lines printed by the target printing apparatus 116. Based on the image data corrected with the correction values, the printing apparatus 108 can print lines having the same widths as those of the lines printed by the target printing apparatus 116. In addition, since adjustment is made on line-width values of vector data, the adjustment can be more detailed.

Other Embodiments

The line-width detection image may include not only achromatic but, but chromatic color lines. The line-width detection image in the above embodiment is an image for detecting the line widths of black lines, but it may include a color line image that uses color inks such as red lines, blue lines, and the like. In that case, print data for printing the width detection image may be obtained (data obtaining), a line-width adjustment value for each line color may be calculated in a process the same as or similar to the one for black lines described above. In correcting a line width, referring to color information in the line drawing command, the line-width adjustment value is switched for each line color to adjust the line width. This operation makes it possible to obtain print results in which optimal line-width adjustment has been performed for each line color.

Although, in the above embodiment, line-width adjustment is performed on vector data, line-width adjustment may be performed on raster data. In this case, the expansion filter (maximum value filter) and the reduction filter (minimum value filter) can be used. The line-width adjustment can be made also for lines other than straight lines, such as curved lines and circles.

The line-width correction may be performed on dot data that is just before printing. In the above embodiment, line-width adjustment is performed by changing line-width values before the rasterization of PDL data. However, the line-width adjustment may be performed by thinning dots at edge portions in a binary dot image just before printing instead of PDL data, or conversely, by adding dots to make it easy for ink bleeding to occur. Directly processing a dot image in the state of binary dot data just before printing as described above makes it possible to perform a more accurate line-width correction by the unit of a dot.

Figure 19:
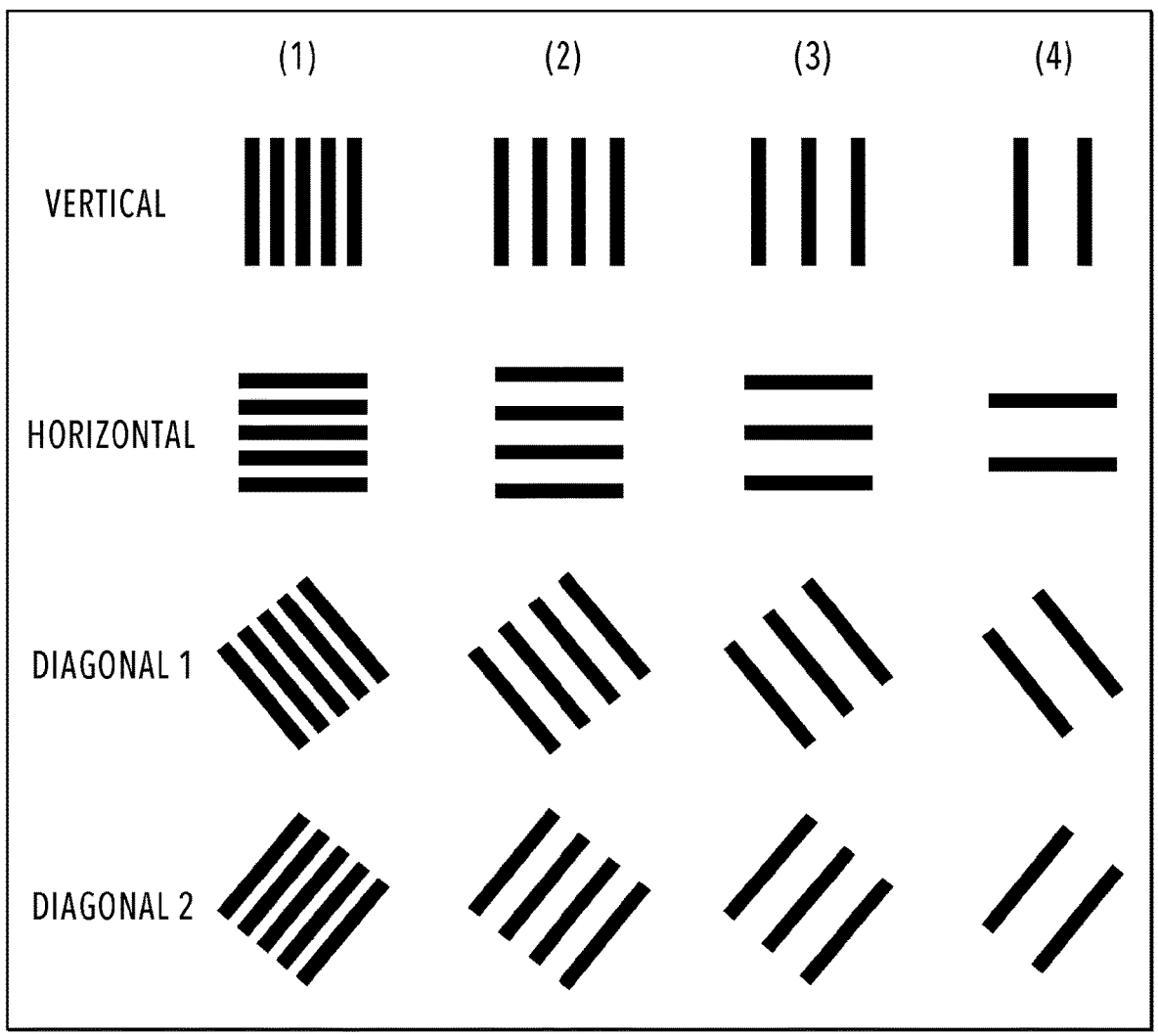
FIG. 19 is an explanatory diagram for another example of a form of a striped image patch.

In addition, besides vertical lines extending in the Y direction (vertical direction) as described above, line widths can be adjusted for horizontal lines extending in the X direction (horizontal direction) and diagonal lines that are oblique to the X and Y directions. For example, as illustrated in FIG. 19, multiple striped image patches may be printed which include vertical lines (vertical), horizontal lines (horizontal), first diagonal lines (diagonal one), and second diagonal lines (diagonal two) whose inclined direction is different from that of the first diagonal lines. To print such striped image patches, these lines are processed separately in the image-data analyzing process 203 and other processes in FIG. 3. Although this operation increases the load for analyzing image data, the widths of lines printed can be adjusted more accurately in the printing apparatuses 108 and 116. For example, for vertical lines and horizontal lines printed by an inkjet printing apparatus of a serial scan type as in FIG. 1A, the positional relationship between a main droplet and the satellites (satellite droplets separated at the time of ejection) of ink ejected from the print head 3 is different. For this reason, line widths tend to be large along the scanning direction of the print head 3. For such cases, the line-width adjustment processes performed separately for vertical lines, horizontal lines, and diagonal lines are effective.

Figure 20:
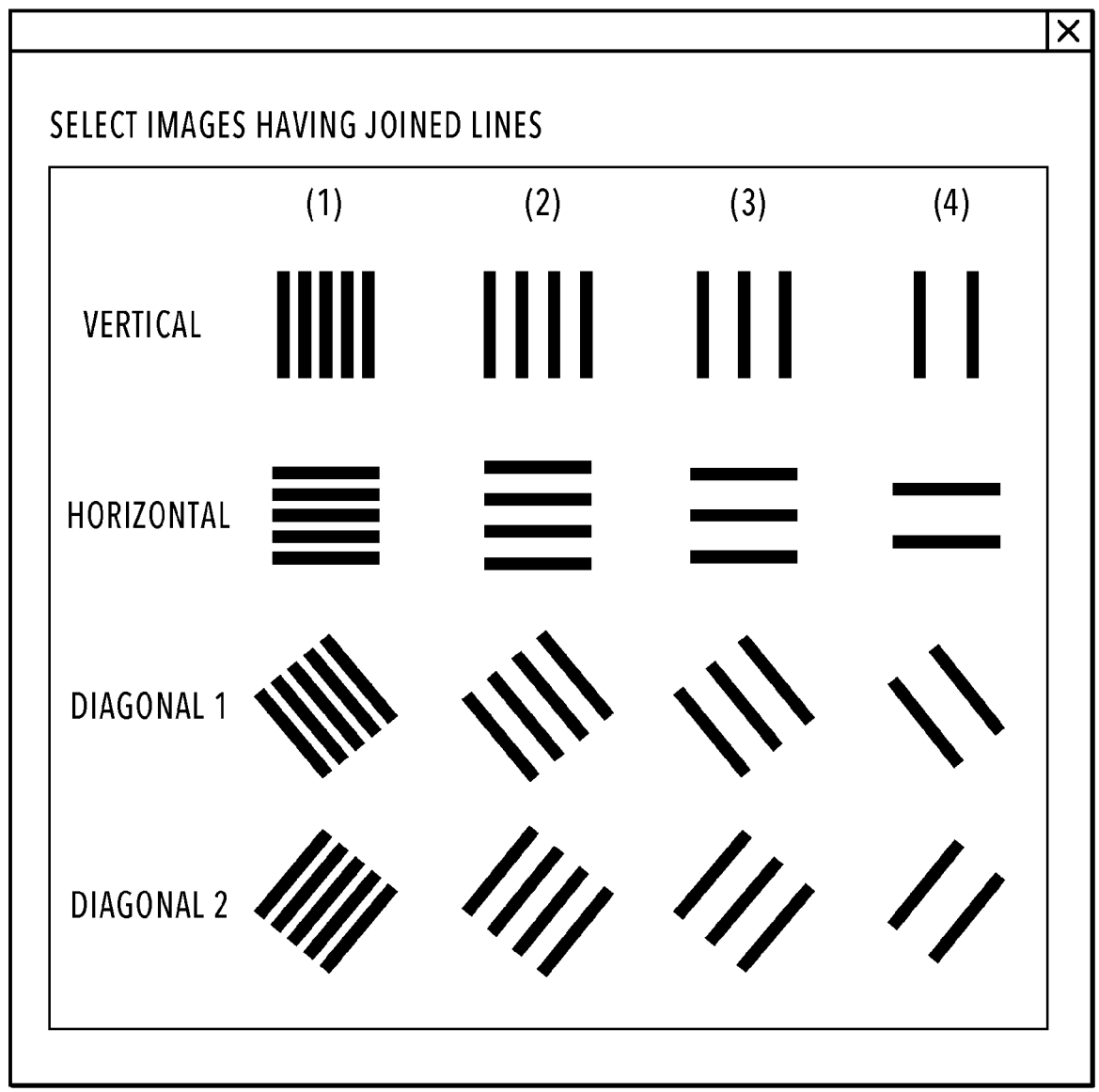
FIG. 20 is an explanatory diagram for a UI screen to prompt the user to input information.

FIG. 20 illustrates an example of a UI (user interface) screen displayed on the image processing apparatus 101 or the printing apparatus 108 or 116, for the user to select the striped image patches in which the gaps are filled from the print results of the multiple striped image patches illustrated in FIG. 19.

In addition, line-width detection images are not limited to patches having striped patterns like the striped image patches, but may be patches in lattice shapes. Use of patches in lattice shapes makes it possible to obtain the degree of bleeding in both the vertical direction and the horizontal direction in an averaging manner with the influence of ink satellites taken into account from the print result of the line-width detection image performed once. In the case of using patches in lattice shapes, the accuracy is a little lower than in the case line width correction in the vertical direction and line width correction in the horizontal direction are performed separately, but line widths in all directions including the vertical direction and the horizontal direction can be corrected in a simple manner. Patches in lattice shapes are not limited to ones including lines in the vertical direction and the horizontal direction but may include diagonal lines.

In addition, the above embodiment is aimed at adjusting the widths of lines printed between different printing apparatuses. However, the present invention is applicable to a method of calibrating the widths of lines printed in a single printing apparatus. For example, not using the widths of lines printed by the target printing apparatus 116 as the target widths, but by setting the target widths to the line widths stated in an inputted PDL data and determining the amount of line-width adjustment, the widths of lines printed in a single printing apparatus can be calibrated.

In addition, the present invention can be applied as a method of detecting the widths of lines printed by a printing apparatus, for the purpose of adjusting the widths of lines printed between different printing apparatuses or calibrating the widths of lines printed in a single printing apparatus, or other purposes. Since the widths of lines printed by a printing apparatus vary due to print conditions such as characteristics of the printing apparatus, the type of print media, the type of ink, and the environment in printing, the detection results of line widths can be used to detect these print conditions.

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus configured to process image information to be printed by a printing apparatus, said information processing apparatus comprising:
   at least one processor operatively coupled to a memory, serving as:
   (a) a data obtaining unit configured to obtain print data for the printing apparatus to print a line-width detection image including first multiple patches, in which each of the first multiple patches includes multiple lines arranged at substantially equal intervals in a first direction, each line having a first width in the first direction and extending in a second direction intersecting the first direction, wherein the first multiple patches includes a first patch and a second patch, and wherein a first substantially equal interval between a first plurality of lines included in the first patch is different from a second substantially equal interval between a second plurality of lines included in the second patch;
   (b) an information obtaining unit configured to obtain information on a print result of the line-width detection image printed by the printing apparatus; and
   (c) a correction unit configured to correct widths of lines in the first direction included in an image to be printed by the printing apparatus based on the information obtained by the information obtaining unit.

2. The information processing apparatus according to claim 1, wherein the information indicates whether paper-white areas exist between the multiple lines in each patch.

3. The information processing apparatus according to claim 1, wherein the line-width detection image further includes second multiple patches, and
   each of the second multiple patches includes multiple lines arranged at substantially equal intervals in the first direction, each line having a second width in the first direction and extending in the second direction,
   wherein the second multiple patches includes a third patch and a fourth patch, and wherein a third substantially equal interval between a third plurality of lines included in the third patch is different from a fourth substantially equal interval between a fourth plurality of lines included in the fourth patch, and
   the second width is different from the first width.

4. The information processing apparatus according to claim 1, wherein the line-width detection image includes symbols associated with the distance between centers in the first direction of two lines adjacent in the first direction of one of the first plurality of lines and the second plurality of lines.

5. The information processing apparatus according to claim 1, wherein the first multiple patches are arranged in the second direction.

6. The information processing apparatus according to claim 5, wherein, in each patch in the first multiple patches, the multiple lines have an approximately same length in the second direction.

7. The information processing apparatus according to claim 5, wherein each patch in the first multiple patches has an approximately same length in the first direction.

8. The information processing apparatus according to claim 5, wherein each patch in the first multiple patches has a length in the first direction greater than or equal to a least common multiple of (i) a sum of a width in the first direction of one line of the lines and a distance between centers in the first direction of two lines adjacent in the first direction of the first plurality of lines and (ii) a width of one pixel corresponding a resolution of rasterization of the printing apparatus.

9. The information processing apparatus according to claim 1, wherein each patch included in the first multiple patches has an approximately same size in the first direction.

10. The information processing apparatus according to claim 1, wherein the printing apparatus includes first and second printing apparatuses,
   the information obtaining unit obtains information on a print result of a line-width detection image printed by the first and second printing apparatuses, and
   the correction unit corrects a width of a line in the first direction included in an image to be printed by the second printing apparatus such that a width of a line printed by the second printing apparatus is adjusted to a width of a line printed by the first printing apparatus.

11. The information processing apparatus according to claim 1, wherein the printing apparatus prints an image on a print medium using a print head for ejecting ink.

12. A printing system comprising a printing apparatus and an information processing apparatus configured to process image information to be printed by the printing apparatus, the information processing apparatus including comprising:
   at least one processor operatively coupled to a memory, serving as:
      (a) a data obtaining unit configured to obtain print data for the printing apparatus to print a line-width detection image including first multiple patches, in which each of the first multiple patches includes multiple lines arranged substantially equal intervals in a first direction, each line having a first width in the first direction and extending in a second direction intersecting the first direction, wherein the first multiple patches includes a first patch and a second patch, and wherein a first substantially equal interval between a first plurality of lines included in the first patch is different from a second substantially equal interval between a second plurality of lines included in the second patch;
      (b) an information obtaining unit configured to obtain information on a print result of the line-width detection image printed by the printing apparatus; and
      (c) a correction unit configured to correct widths of lines in the first direction included in an image to be printed by the printing apparatus based on the information obtained by the information obtaining unit.

13. An information processing method of processing image information to be printed by a printing apparatus, said method comprising:
   an obtaining step of obtaining, by a data obtaining unit, print data for the printing apparatus to print a line-width detection image including first multiple patches, in which each of the first multiple patches includes multiple lines arranged at substantially equal intervals in a first direction, each line having a first width in the first direction and extending in a second direction intersecting the first direction, wherein the first multiple patches includes a first patch and a second patch, and wherein a first substantially equal interval between a first plurality of lines included in the first patch is different from a second substantially equal interval between a second plurality of lines included in the second patch;
   an obtaining step of obtaining, by an information obtaining unit, information on a print result of the line-width detection image printed by the printing apparatus; and
   a correcting step of correcting, by a correction unit, widths of lines in the first direction included in an image to be printed by the printing apparatus based on the information obtained by the information obtaining unit,
   wherein the data obtaining unit, the information obtaining unit, and the correction unit are implemented by at least one processor of an image processing apparatus.

14. A non-transitory computer readable storage medium storing a program for causing a computer to execute an information processing method of processing image information to be printed by a printing apparatus, the method comprising:
   an obtaining step of obtaining, by a data obtaining unit, print data for the printing apparatus to print a line-width detection image including first multiple patches, in which each of the first multiple patches includes multiple lines arranged at substantially equal intervals in a first direction, each line having a first width in the first direction and extending in a second direction intersecting the first direction, wherein the first multiple patches includes a first patch and a second patch, and wherein a first substantially equal interval between a first plurality of lines included in the first patch is different from a second substantially equal interval between a second plurality of lines included in the second patch;
   an obtaining step of obtaining, by an information obtaining unit, information on a print result of the line-width detection image printed by the printing apparatus; and
   a correcting step of correcting, by a correction unit, widths of lines in the first direction included in an image to be printed by the printing apparatus based on the information obtained by the information obtaining unit,
   wherein the data obtaining unit, the information obtaining unit, and the correction unit are implemented by at least one processor of an image processing apparatus.

* * * * *